United States Patent
Marti et al.

(10) Patent No.: US 9,933,762 B2
(45) Date of Patent: Apr. 3, 2018

(54) MULTISITE VERSION AND UPGRADE MANAGEMENT SYSTEM

(71) Applicant: Honeywell International Inc., Morristown, NJ (US)

(72) Inventors: Jerry Marti, West Salem, OH (US); Prabhat Ranjan, Bangalore (IN); Sundaramoorthi Thangavel, Bangalore (IN); Midhun Naga Kumar Jonnadula, Bangalore (IN); Prashant Gupta, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 550 days.

(21) Appl. No.: 14/327,451

(22) Filed: Jul. 9, 2014

(65) Prior Publication Data

US 2016/0011573 A1  Jan. 14, 2016

(51) Int. Cl.
  *G06F 9/44* (2006.01)
  *G05B 15/02* (2006.01)
  (Continued)

(52) U.S. Cl.
  CPC ......... *G05B 15/02* (2013.01); *G05B 19/4185* (2013.01); *G06F 8/65* (2013.01);
  (Continued)

(58) Field of Classification Search
  CPC ............... G05B 15/02; G05B 19/4185; G05B 2219/31418; G06F 8/00; H04L 67/10; H04L 67/34
  (Continued)

(56) References Cited

U.S. PATENT DOCUMENTS

| 4,375,637 A | 3/1983 | Desjardins |
| 4,816,208 A | 3/1989 | Woods et al. |

(Continued)

FOREIGN PATENT DOCUMENTS

| WO | WO 01/97146 | 12/2001 |
| WO | WO 02/052432 | 7/2002 |

(Continued)

OTHER PUBLICATIONS

Bersoff et al., "Impacts of Life Cycle Models on Software," Communications of the ACM, vol. 34, No. 8, pp. 104-118, Aug. 1991.

(Continued)

*Primary Examiner* — Lewis A Bullock, Jr.
*Assistant Examiner* — Theodore Hebert
(74) *Attorney, Agent, or Firm* — Seager, Tufte & Wickhem, LLP

(57) ABSTRACT

A multisite version and upgrade management system for controllers. The system may have a supervisor and one or more site controllers managed by the supervisor. The site controllers may be subject to commissioning for another version, an upgrade of software or an upgrade of a configuration for a site controller. The commissioning and upgrades may be implemented by the supervisor for a large number of site controllers in a much shorter period of time in contrast to a previous approach implementing the same items in a one by one approach. With the present approach, a significant number of site controllers may be selected for implementation of the commissioning and upgrades according to groups and categories. The implementation for the number of site controllers may be executed as a job. Licensing needed for the implementation may be procured by the present system.

14 Claims, 31 Drawing Sheets

(51) Int. Cl.
*H04L 29/08* (2006.01)
*G05B 19/418* (2006.01)
*G06F 9/445* (2018.01)

(52) U.S. Cl.
CPC .............. *H04L 67/10* (2013.01); *H04L 67/34* (2013.01); *G05B 2219/31418* (2013.01); *Y02P 90/18* (2015.11)

(58) Field of Classification Search
USPC ......................................................... 717/170
See application file for complete search history.

(56) References Cited

U.S. PATENT DOCUMENTS

| | | |
|---|---|---|
| 5,042,265 A | 8/1991 | Baldwin et al. |
| 5,161,387 A | 11/1992 | Metcalfe et al. |
| 5,385,297 A | 1/1995 | Rein et al. |
| 5,390,206 A | 2/1995 | Rein et al. |
| 5,544,036 A | 8/1996 | Brown, Jr. et al. |
| 5,768,119 A | 6/1998 | Havekost et al. |
| 5,929,761 A | 7/1999 | Van der Laan et al. |
| 5,949,303 A | 9/1999 | Arvidsson et al. |
| 5,955,306 A | 9/1999 | Beheshti et al. |
| 6,031,343 A | 2/2000 | Recknagel et al. |
| 6,124,790 A | 9/2000 | Golov et al. |
| 6,141,595 A | 10/2000 | Gloudeman et al. |
| 6,178,362 B1 | 1/2001 | Woolard et al. |
| 6,185,483 B1 | 2/2001 | Drees |
| 6,195,309 B1 | 2/2001 | Ematrudo |
| 6,223,544 B1 | 5/2001 | Seem |
| 6,295,526 B1 | 9/2001 | Kreiner et al. |
| 6,295,527 B1 | 9/2001 | McCormack et al. |
| 6,301,624 B1 | 10/2001 | Lee et al. |
| 6,314,328 B1 | 11/2001 | Powell |
| 6,351,213 B1 | 2/2002 | Hirsch |
| 6,356,282 B2 | 3/2002 | Roytman et al. |
| 6,389,464 B1 | 5/2002 | Krishnamurthy et al. |
| 6,420,968 B1 | 7/2002 | Hirsch |
| 6,430,712 B2 | 8/2002 | Lewis |
| 6,466,654 B1 | 10/2002 | Cooper et al. |
| 6,473,407 B1 | 10/2002 | Ditmer et al. |
| 6,492,901 B1 | 12/2002 | Ridolfo |
| 6,535,122 B1 | 3/2003 | Bristol |
| 6,549,135 B2 | 4/2003 | Singh et al. |
| 6,643,355 B1 | 11/2003 | Tsumpes |
| 6,643,516 B1 | 11/2003 | Stewart |
| 6,675,591 B2 | 1/2004 | Singh et al. |
| 6,681,156 B1 | 1/2004 | Weiss |
| 6,690,980 B2 | 2/2004 | Powell |
| 6,761,470 B2 | 7/2004 | Sid |
| 6,813,587 B2 | 11/2004 | McIntyre et al. |
| 6,816,811 B2 | 11/2004 | Seem |
| 6,832,120 B1 | 12/2004 | Frank et al. |
| 6,836,794 B1* | 12/2004 | Lucovsky .................. G06F 8/61 709/223 |
| 6,859,827 B2 | 2/2005 | Banginwar |
| 6,870,141 B2 | 3/2005 | Damrath et al. |
| 6,879,253 B1 | 4/2005 | Thuillard |
| 6,892,546 B2 | 5/2005 | Singh et al. |
| 6,919,809 B2 | 7/2005 | Blunn et al. |
| 6,947,972 B2 | 9/2005 | Chun |
| 6,955,302 B2 | 10/2005 | Erdman, Jr. |
| 6,957,110 B2 | 10/2005 | Wewalaarachchi et al. |
| 6,966,060 B1 | 11/2005 | Young et al. |
| 6,970,763 B2 | 11/2005 | Kato |
| 6,973,627 B1 | 12/2005 | Appling |
| 6,990,821 B2 | 1/2006 | Singh et al. |
| 7,006,524 B2 | 2/2006 | Freeman et al. |
| 7,009,510 B1 | 3/2006 | Douglass et al. |
| 7,024,283 B2 | 4/2006 | Bicknell |
| 7,026,925 B2 | 4/2006 | Roche et al. |
| 7,031,880 B1 | 4/2006 | Seem et al. |
| 7,062,389 B2 | 6/2006 | Johnson et al. |
| 7,068,391 B2 | 6/2006 | Dewitte et al. |
| 7,068,931 B2 | 6/2006 | Tokunaga |
| 7,069,181 B2 | 6/2006 | Jerg et al. |
| 7,085,674 B2 | 8/2006 | Iwasawa |
| 7,107,268 B1 | 9/2006 | Zawadzki et al. |
| 7,113,085 B2 | 9/2006 | Havekost |
| 7,133,141 B1 | 11/2006 | Abi-Salch |
| 7,155,462 B1* | 12/2006 | Singh ......................... G06F 8/65 707/695 |
| 7,171,287 B2 | 1/2007 | Weiss |
| 7,183,907 B2 | 2/2007 | Simon et al. |
| 7,206,646 B2 | 4/2007 | Nilson et al. |
| 7,243,044 B2 | 7/2007 | McCalla |
| 7,250,856 B2 | 7/2007 | Havekost et al. |
| 7,260,619 B2 | 8/2007 | Yoneda |
| 7,272,452 B2 | 9/2007 | Coogan et al. |
| 7,277,018 B2 | 10/2007 | Reyes et al. |
| 7,302,478 B2 | 11/2007 | Conrad |
| 7,308,539 B2 | 12/2007 | Fuhs et al. |
| 7,320,023 B2 | 1/2008 | Chintalapati et al. |
| 7,345,580 B2 | 3/2008 | Akamatsu et al. |
| 7,379,997 B2 | 5/2008 | Ehlers et al. |
| 7,386,586 B1 | 6/2008 | Headley et al. |
| 7,428,726 B1 | 9/2008 | Cowan et al. |
| 7,457,869 B2 | 11/2008 | Kernan |
| 7,460,020 B2 | 12/2008 | Reyes et al. |
| 7,490,319 B2 | 2/2009 | Blackwell et al. |
| 7,496,911 B2* | 2/2009 | Rowley ...................... G06F 8/61 717/174 |
| 7,565,225 B2 | 7/2009 | Dushane et al. |
| 7,596,613 B2 | 9/2009 | Silverthorne et al. |
| 7,502,329 B2 | 10/2009 | Li et al. |
| 7,644,371 B2 | 1/2010 | Robertson et al. |
| 7,653,459 B2 | 1/2010 | Pouchak et al. |
| 7,703,073 B2 | 4/2010 | Illowsky et al. |
| 7,734,572 B2 | 6/2010 | Wiemeyer et al. |
| 7,760,081 B2* | 7/2010 | Eiden ....................... G08B 17/00 340/506 |
| 7,774,457 B1 | 8/2010 | Talwar et al. |
| 7,782,302 B2 | 8/2010 | Lee et al. |
| 7,819,334 B2 | 10/2010 | Pouchak et al. |
| 7,826,929 B2 | 11/2010 | Wacker |
| 7,870,090 B2 | 1/2011 | McCoy et al. |
| 7,873,719 B2 | 1/2011 | Bishop et al. |
| 7,886,031 B1 | 2/2011 | Taylor et al. |
| 7,890,927 B2 | 2/2011 | Eldridge et al. |
| 7,900,228 B2 | 3/2011 | Stark et al. |
| 7,904,186 B2 | 3/2011 | Mairs et al. |
| 7,904,608 B2* | 3/2011 | Price ......................... G06F 8/65 710/10 |
| 7,928,239 B2 | 4/2011 | Dumas et al. |
| 7,933,981 B1 | 4/2011 | Cannon, III et al. |
| 7,941,786 B2 | 5/2011 | Scott et al. |
| 7,953,847 B2 | 5/2011 | Grelewicz et al. |
| 8,059,301 B2 | 11/2011 | Eigenbrodt et al. |
| 8,060,602 B2 | 11/2011 | Singh et al. |
| 8,078,481 B2 | 12/2011 | Steinbarth et al. |
| 8,090,477 B1 | 1/2012 | Steinberg |
| 8,112,162 B2 | 2/2012 | Pouchak et al. |
| 8,144,028 B2 | 3/2012 | LaMothe et al. |
| 8,146,060 B2 | 3/2012 | Lekel |
| 8,185,871 B2 | 5/2012 | Nixon et al. |
| 8,190,273 B1 | 5/2012 | Federspiel et al. |
| 8,218,570 B2 | 7/2012 | Moran et al. |
| 8,224,466 B2 | 7/2012 | Wacker |
| 8,224,763 B2 | 7/2012 | Guralnik et al. |
| 8,224,888 B2 | 7/2012 | Brindle |
| 8,225,292 B2* | 7/2012 | Naslavsky .......... G06F 11/3688 717/126 |
| 8,239,500 B2 | 8/2012 | Pouchak |
| 8,255,896 B2* | 8/2012 | Wontorcik ............. G06Q 10/06 340/506 |
| 8,301,386 B1 | 10/2012 | Redmond et al. |
| 8,335,593 B2 | 12/2012 | Johnson et al. |
| 8,341,599 B1* | 12/2012 | Angalet ............. G06F 9/44505 717/104 |
| 8,347,291 B2 | 1/2013 | Marwinski |
| 8,352,047 B2 | 1/2013 | Walter |
| 8,417,666 B2 | 4/2013 | Bailor et al. |
| 8,527,947 B2 | 9/2013 | Clemm |

(56) References Cited

U.S. PATENT DOCUMENTS

| | | | |
|---|---|---|---|
| 8,572,502 B2 | 10/2013 | Dharwada et al. | |
| 8,572,616 B2 | 10/2013 | Cai et al. | |
| 8,577,940 B2 | 11/2013 | Tormasov et al. | |
| 8,594,850 B1* | 11/2013 | Gourlay | G05B 15/02 165/11.1 |
| 8,600,556 B2 | 12/2013 | Nesler et al. | |
| 8,819,562 B2 | 8/2014 | Nair et al. | |
| 8,892,954 B1* | 11/2014 | Gray | G06F 8/65 714/15 |
| 8,930,030 B2 | 1/2015 | Bester et al. | |
| 8,938,557 B2 | 1/2015 | Meyer et al. | |
| 8,954,016 B2 | 2/2015 | Seiler et al. | |
| 8,965,850 B2 | 2/2015 | Varadarajan | |
| 8,984,169 B2 | 3/2015 | Mera et al. | |
| 9,026,253 B2 | 5/2015 | Majewski et al. | |
| 9,043,463 B1 | 5/2015 | Cohn et al. | |
| 9,122,535 B2 | 9/2015 | Soundararajan et al. | |
| 9,239,718 B2* | 1/2016 | Grinberg | G06F 8/665 |
| 9,389,850 B2* | 7/2016 | Walter | G06F 8/71 |
| 9,395,711 B2 | 7/2016 | Clark et al. | |
| 9,423,789 B2 | 8/2016 | Cornett et al. | |
| 9,578,465 B2 | 2/2017 | Da Silva Neto et al. | |
| 2002/0002425 A1 | 1/2002 | Dossey et al. | |
| 2002/0073076 A1 | 6/2002 | Xu et al. | |
| 2002/0122073 A1 | 9/2002 | Abrams et al. | |
| 2002/0152298 A1 | 10/2002 | Kikta et al. | |
| 2003/0078677 A1 | 4/2003 | Hull et al. | |
| 2003/0101009 A1 | 5/2003 | Seem | |
| 2003/0171851 A1 | 9/2003 | Brickfield et al. | |
| 2003/0217357 A1* | 11/2003 | Parry | G06F 8/65 717/168 |
| 2004/0027004 A1 | 2/2004 | Bayoumi et al. | |
| 2004/0138981 A1* | 7/2004 | Ehlers | F24F 11/0012 705/36 R |
| 2004/0143510 A1 | 7/2004 | Haeberle et al. | |
| 2004/0230328 A1* | 11/2004 | Armstrong | G05B 19/418 700/83 |
| 2005/0038571 A1 | 2/2005 | Brickfield et al. | |
| 2005/0043862 A1 | 2/2005 | Brickfield et al. | |
| 2005/0071457 A1* | 3/2005 | Yang-Huffman | H04L 41/0893 709/224 |
| 2005/0143863 A1 | 6/2005 | Ruane et al. | |
| 2005/0193285 A1 | 9/2005 | Jeon | |
| 2005/0201393 A1* | 9/2005 | Hatayama | H04L 12/2807 370/401 |
| 2005/0203490 A1 | 9/2005 | Simonson | |
| 2005/0222889 A1 | 10/2005 | Lai et al. | |
| 2006/0020962 A1 | 1/2006 | Stark et al. | |
| 2006/0038672 A1 | 2/2006 | Schoettle | |
| 2006/0058923 A1 | 3/2006 | Kruk et al. | |
| 2006/0064305 A1 | 3/2006 | Alonso | |
| 2006/0069886 A1 | 3/2006 | Sandoval | |
| 2006/0077726 A1 | 4/2006 | Simmitsu | |
| 2006/0095835 A1 | 5/2006 | Kennedy et al. | |
| 2006/0136558 A1 | 6/2006 | Sheehan et al. | |
| 2006/0168013 A1 | 7/2006 | Wilson et al. | |
| 2006/0253205 A1 | 11/2006 | Gardiner | |
| 2006/0265708 A1* | 11/2006 | Blanding | G06F 8/65 717/174 |
| 2007/0078913 A1 | 4/2007 | Crescenti et al. | |
| 2007/0123249 A1 | 5/2007 | Sun | |
| 2007/0198674 A1 | 8/2007 | Li et al. | |
| 2008/0005787 A1* | 1/2008 | Aldred | G06F 21/105 726/4 |
| 2008/0010049 A1 | 1/2008 | Pouchak et al. | |
| 2008/0189162 A1 | 8/2008 | Ganong et al. | |
| 2008/0301668 A1* | 12/2008 | Zachmann | G06F 8/67 717/173 |
| 2009/0055914 A1 | 2/2009 | Azami | |
| 2009/0106684 A1 | 4/2009 | Chakra et al. | |
| 2009/0113037 A1 | 4/2009 | Pouchak | |
| 2009/0205040 A1* | 8/2009 | Zunke | G06F 8/65 726/14 |
| 2009/0287526 A1 | 11/2009 | Ramkumar et al. | |
| 2009/0295571 A1* | 12/2009 | Hosey | G08B 25/08 340/540 |
| 2009/0319532 A1 | 12/2009 | Akelbein et al. | |
| 2010/0031324 A1* | 2/2010 | Strich | G06F 21/10 726/4 |
| 2010/0106543 A1 | 4/2010 | Marti | |
| 2010/0131653 A1 | 5/2010 | Dharwada et al. | |
| 2010/0131877 A1 | 5/2010 | Dharwada et al. | |
| 2010/0169200 A1* | 7/2010 | Gomes | G06F 8/65 705/35 |
| 2010/0198651 A1 | 8/2010 | Johnson et al. | |
| 2010/0251184 A1 | 9/2010 | Majewski et al. | |
| 2010/0286937 A1 | 11/2010 | Hedley et al. | |
| 2011/0010654 A1 | 1/2011 | Raymond et al. | |
| 2011/0087731 A1 | 4/2011 | Wong et al. | |
| 2011/0093493 A1* | 4/2011 | Nair | G06Q 10/06 707/769 |
| 2011/0098863 A1 | 4/2011 | Miki | |
| 2011/0113360 A1 | 5/2011 | Johnson et al. | |
| 2011/0196539 A1* | 8/2011 | Nair | G05B 19/41865 700/276 |
| 2011/0225580 A1* | 9/2011 | Nair | G06F 9/44505 717/178 |
| 2011/0231833 A1* | 9/2011 | Narayanan | G06F 8/67 717/171 |
| 2011/0298608 A1 | 12/2011 | Ranjan et al. | |
| 2011/0316688 A1 | 12/2011 | Ranjan et al. | |
| 2012/0005731 A1 | 1/2012 | Lei et al. | |
| 2012/0011496 A1* | 1/2012 | Shimamura | G06F 9/44521 717/170 |
| 2012/0166992 A1 | 6/2012 | Huynh et al. | |
| 2013/0218889 A1 | 8/2013 | Marti et al. | |
| 2014/0033193 A1* | 1/2014 | Palaniappan | G06F 8/65 717/173 |
| 2014/0114440 A1 | 4/2014 | Marti et al. | |
| 2014/0149973 A1* | 5/2014 | Walter | G06F 8/665 717/170 |
| 2014/0173581 A1* | 6/2014 | Grinberg | G06F 8/665 717/170 |
| 2014/0237465 A1* | 8/2014 | Lin | H04L 67/1063 717/173 |
| 2014/0280878 A1 | 9/2014 | Hardin et al. | |
| 2014/0289202 A1 | 9/2014 | Chan et al. | |
| 2014/0344798 A1* | 11/2014 | Sasaki | G05B 19/0426 717/170 |
| 2015/0007157 A1* | 1/2015 | Park | G06F 8/65 717/170 |
| 2015/0105878 A1 | 4/2015 | Jones et al. | |
| 2015/0112989 A1* | 4/2015 | Marti | G06Q 10/06 707/737 |
| 2015/0201020 A1 | 7/2015 | Gueta | |
| 2015/0295998 A1 | 10/2015 | Morrill et al. | |
| 2016/0011573 A1* | 1/2016 | Marti | G05B 15/02 700/9 |
| 2017/0102680 A1 | 4/2017 | Marti et al. | |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

U.S. Appl. No. 14/059,286, filed Oct. 21, 2013.
http://domin.dom.edu/documents/emaildocs/outlook/, "Outlook Web Access 2003," 19 pages, printed Nov. 7, 2013.
Kalavade et al., "A Hardware-Software Codesign Methodology for DSP Applications," IEEE Design and Test of Computers, pp. 16-28, 1993.

(56) References Cited

OTHER PUBLICATIONS

Magnusson et al., "Simics: A Full Simulation Platform," IEEE, pp. 50-58, 2002.
McCown et al., "APSIM: A Novel Software System for Model Development, Model Testing and Simulation in Agricultural Systems Research," Agricultural Systems, vol. 50, pp. 255-271, 1996.
Niagara, "Niagara AX-3.x User Guide," Tridium Inc., 436 pages, 2007.
Pressman, "Software Engineering Notes—Compiled from Software Engineering a Practitioner's Approach," Fifth Edition, 67 pages, 2009.
Simunic et al, "Cycle-Accurate Simulation of Energy Consumption in Embedded Systems," ACM, pp. 867-872, 1999.
Trane, "Tracer MP580/581 Programmable Controllers," CNT-PRC002-EN, Mar. 2003.
Vykon by Tridium, "Niagara Browser Access Guide," 125 pages, revised Aug. 15, 2002.
Vykon by Tridium, "Niagara Networking & Connectivity Guide," Niagara Release 2.3, 245 pages, 2002.
Adobe Acrobat 6.0 Standard, Version 6.0.2, Screenshots, 2 pages, May 18, 2004.
Atere-Roberts et al., "Implementation of a Computerized Maintenance Management System for the City of Atlanta," 13 pages, Proceedings of the Water Environment Federation, Jan. 1, 2002.
Business Objects, Crystal Reports Acess, Format, and Integrate Data, 4 pages, Dec. 2003.
Honeywell Spyder Bacnet User's Guide, 242 pages, Revised Jul. 2009.
Honeywell Spyder User's Guide 202 pages, Released Jul. 2007.
Honeywell, "ComfortPoint Open BMS Release 100," Specification and Technical Data, 13 pages, Jun. 2012.
Honeywell, "Excel Building Supervisor-Integrated R7044 and FS90 Ver. 2.0," Operator Manual, 70 pages, Apr. 1995.
Honeywell, "Excel 15B W7760B Building Manager," User's Guide, 84 pages, Revised Jan. 2005.
http://blogs.msdn.com/b/khen1234/archive/2005/05/11/416392.aspx, "Regular Expressions in T-SQL," 4 pages, May 11, 2005.
http://en.wikipedia.org/wiki/JAR_(file_format), "JAR (file Format)—Wikipedia, the Free Encyclopedia," 3 pages, printed Dec. 26, 2009.
http://www.de2m.com/DE2R_Technical.html, "Data Enabled Enterprise Repository (DE2R) Technical Overview," 4 pages, printed Mar. 8, 2013.
http://www.google.com/maps, "Google Maps, Pin Location," 1 page, prior to Nov. 21, 2008.
Johnson Controls, "Fx Workbench, User's Guide," 818 pages, issued May 19, 2008.
Microsoft Word Screen Shots, 2 pages, prior to Nov. 21, 2008.
Novar, "Opus Supervisor User Guide," pp. 1-159, Feb. 1, 2012.
Novar, "Demand Response, Program Implementation and Execution," 8 pages, Oct. 28, 2008.
Novar, "Media Backgrounder," 10 pages, prior to Feb. 22, 2012.
Siemens, BACnet for DESIGO 27 pages, prior to Dec. 30, 2009.
Trane, "System Programming, Tracer Summit Version 14, BMTW-SVP01D-EN," 623 pages, 2002.
Tridium, "NiagaraAX Product Model Overview," 7 pages, 2005.
Tridium, "Tridium & Niagara Framework Overview," 9 pages, prior to Oct. 28, 2008.
http://www.loytec.com/products/web/lweb-900, "LWEB-900 Integrated Building Management System," 5 pages, printed Nov. 15, 2014.
Samsung, "Intelligent Building Management System, ControlCity-NX," 20 pages, May 31, 2012.
U.S. Appl. No. 14/862,715, filed Sep. 23, 2015.
U.S. Appl. No. 14/862,858, filed Sep. 23, 2015.

\* cited by examiner

← 347

- ⊙ DemandCalc (Opus Data Set Component)
- ☐ ⊙ Data Set Name — `DemandCalc`
- ☐ ⊙ Entity Name List
- ☐ ⊙ Entity Class List
- ⊟ ⊙ kitControl:SlidingWindowDemandCalc-0    Energy
  - ☐ ⊙ Data Set Instance Name — `BuildingMeterCalc`
  - ☐ ⊙ Location — `/Energy/BuildingPower/BuildingMeterCalc`
  - ☐ ⊙ Entity Name — `Energy`
  - ☐ ⊙ Entity Type — `Energy`
  - ☐ ⊙ Entity Equip — `Energy`
  - ☐ ⊙ Entity Class — `CustomControl`
  - ⊟ ⊙ DataPollPoints    Data Poll Property
    - ☐ ⊙ Kwh Per Pulse — `1.000` kW-hr
    - ☐ ⊙ displayNames — `{resetDayOfMonth=Reset Day Of Month;enab`
    - ☐ ⊙ Enable Reset — ⊙ false ▼
    - ☐ ⊙ Reset Day Of Month — `1` [1 - 31]
    - ☐ ⊙ Reset Day Of Week — `Sunday` ▼
    - ☐ ⊙ Reset Time — `12:00:00 AM IST`
    - ☐ ⊙ Meter Rollover — `65535`
- ⊟ ⊙ kitControl:SlidingWindowDemandCalc-1    MTR Main Meter
  - ☐ ⊙ Data Set Instance Name — `MeterCalc`
  - ☐ ⊙ Location — `/Energy/Meters/MTR01/MeterCalc`
  - ☐ ⊙ Entity Name — `MTR Main Meter`
  - ☐ ⊙ Entity Type — `Meter`
  - ☐ ⊙ Entity Equip — `MTR01`
  - ☐ ⊙ Entity Class — `CustomControl`
  - ⊟ ⊙ DataPollPoints    Data Poll Property
    - ☐ ⊙ Kwh Per Pulse — `1.000` kW-hr
    - ☐ ⊙ Enable Reset — ◯ true ▼
    - ☐ ⊙ Reset Day Of Month — `1` [1 - 31]
    - ☐ ⊙ Reset Day Of Week — `Sunday` ▼
    - ☐ ⊙ Reset Time — `12:00:00 AM IST`

FIGURE 15

| | | |
|---|---|---|
| ⊞◇ all (Job Component) | | |
| ☐ ● Job Name | all | |
| ☐ ● Description | all | |
| ☐ ● Is Data Set Level | ○ true ▼ | |
| ⊟ ● UserSelection | User Selection | |
| ☐ ● Group | Lace ▼ | |
| ☐ ● Category | 0 ▼ | |
| ☐ ● Category Group | 0 ▼ | |
| ☐ ● Site | 54CityOH ▼ | |
| ☐ ● Xcm | TestXCM ▼ | |
| ☐ ● Dataset | AHUControlIOM ▼ | |

┌─ Device IO (Data Poll Report)

| | Report Name | Device%20IO |
| | Description | Device%20Inputs%20Outputs%20Report |
| | Report Type | 2 |
| | Is Predefined | ● true |
| | Last Executed Time | 16-Nov-12 6:31 PM IST |

← 501

| FullCommissioning (Opus Version Upgrade Job) | |
|---|---|
| ☐ ⦿ Job Name | FullCommissioning |
| ☐ ⦿ Description | Full Commissioning |
| ⊟ ⦿ UserSelections | Component |
| ☐ ⦿ Group | Walmart ▼ |
| ☐ ⦿ Category | 0 ▼ |
| ☐ ⦿ Site | 678NewYorkOH ▼ |
| ☐ ⦿ XCM | RTU ▼ |
| ☐ ⦿ StationList | Walmart_678NewYorkOH_RTU ▼ |
| ☐ ⦿ UpgradeType | FULL_COMMISSIONING ▼ |
| ☐ ⦿ UpgradeValue | Opus_XCM10_59Upgrade.dist ▼ |

MULTISITE VERSION AND UPGRADE MANAGEMENT SYSTEM

BACKGROUND

The present disclosure pertains to processing and particularly to controllers. More particularly, the disclosure pertains to managing large numbers of controllers.

SUMMARY

The disclosure reveals a multisite version and upgrade management system. The system may have a supervisor and one or more site controllers managed by the supervisor. The site controllers may be subject to commissioning for another version, an upgrade of software or an upgrade of a configuration for a site controller. The commissioning and upgrades may be implemented by the supervisor for a large number of site controllers in a much shorter period of time in contrast to a previous approach implementing the same items in a one by one approach. With the present approach, a significant number of site controllers may be selected for implementation of the commissioning and upgrades according to groups and categories. The implementation for the number of site controllers may be executed as a job. Licensing needed for the implementation may be procured by the present system.

BRIEF DESCRIPTION OF THE DRAWING

FIG. 15 is a diagram of an example dataset component for a demand calculation of a dataset name bog;

FIG. 16 is a diagram of an example collection job component structure;

FIG. 24 may be an example of a data structure and content of a data poll report component which stores a report configuration;

FIG. 30 is a diagram of a data structure relating to content of a version upgrade job component.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The Novar™ Opus™ supervisor may be a target application to provide the present approach and system. An Opus supervisor may be a component that provides centralized multi-site supervisory applications. An Opus architect may be a user interface component providing multiple users access to the Opus system.

Figure 1:
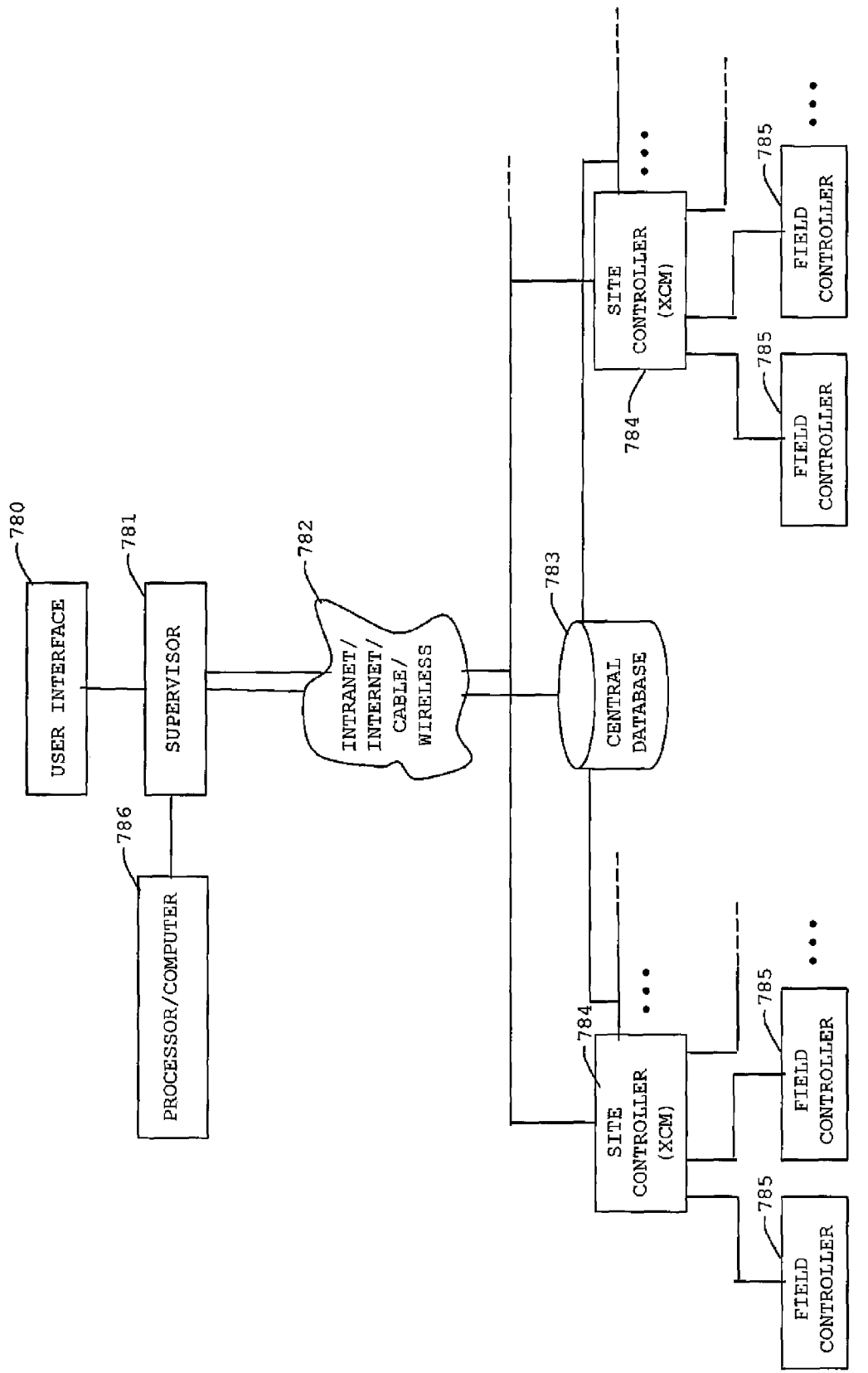
FIG. 1 is a diagram of a layout of supervisor, site controllers and field controllers.

In FIG. 1, a user with an interface 780 of the Novar Opus supervisor 781 may manage and communicate with hundreds or thousands of remote site controllers 784 from a centralized location via the users' intranet/internet/cable/wireless 782. Each of the site controllers 784 may be referred to as an XCM controller or an XCM. A central database or store 783 may provide storage for controllers 784 and other mechanisms. Database 783 may be managed by supervisor 781. The XCM controller 784 in turn may manage and communicate with tens or hundreds of field controllers 785, within the site, that perform real time control of building equipment such as HVAC units, lighting panels, metering and refrigeration circuits, and other items. A processor/computer 786 may be connected to supervisor 781 for operational and/or other purposes. Processor/computer 786 may also be utilized for various purposes relative to other components of system Novar may periodically release new versions of Opus to its customers. This may require either Novar or the customer to install and upgrade the Opus supervisor, Opus architects and Opus XCM's with this new version. There may be three scenarios regarding managing either new or updated Opus software to the customer installed base. They may incorporate: 1) Full Opus XCM commission (new Niagara version); 2) Upgrade of patched Opus software modules; and 3) Upgrade of the XCM station configurations.

Each of these scenarios may require significant manual labor and incur noticeable costs to perform using the previous software and tools. The previous scenarios may also require an operator to be a more technically skilled than one to perform the scenarios with the present approach and system. The first scenario of a full Opus XCM commission process may be a manual operation that consumes an average of 30 minutes per XCM from start to finish. Each XCM controller may need to be individually commissioned using the previous tools. Many customers may have 1000's of sites resulting in weeks of time spent performing these commissioning processes.

The second scenario of upgrading patched Opus software may be performed against multiple Opus XCM targets using the previous software. However, the previous application view may require the user to select one or more XCM's from a large list of all the XCM station names. If an intent is to upgrade all, the user may easily invoke a check all button. However, if only select XCMs are being targeted, the user may need to browse the large list and make the individual XCM selections.

The third scenario of upgrading XCM station configurations may be managed in the previous application by executing one or more Novar XCM station robot files. Robots may be blocks of program code designed and provided by Novar to execute one time in each XCM to alter the XCM station configuration per the new version requirements. The previous application may provide a way to load and execute the provided robot files; however, it may be a highly technical operation that requires significant engineering skills and Niagara proficiency to perform.

In addition to the issues described in these scenarios, the previous application does not necessarily provide any view allowing the user to see the software versions within the deployed XCMs. The user may need to connect to each XCM station to see the Opus version, Niagara version and XCM station configuration version. In summary, issues with performing these operations with the previous application may be the greater manual labor cost to perform and the higher level of technical expertise required to perform the tasks than with the present approach and system.

The present approach and system may provide a solution to the noted issues by providing the product features and the necessary user activities needed to use these features. The Opus supervisor may provide a new Opus version management service with improved usability and performance realized with the following multisite features.

One, there may be an XCM version overview screen. The present Opus supervisor version management service may provide a top level overview screen displaying virtually all XCM version information. The service may execute a background job to periodically refresh a local versions database file to ensure that the information is fresh. The overview may allow the user to quickly see the Niagara version, Opus version and station configuration versions across the off the site XCM controllers. With this information, the user may be able to evaluate which sites need to be upgraded. In the previous Opus application, the user may individually connect to each Opus XCM controller to find this information each from its own unique location within the XCM station configuration.

Two, there may be XCM full commissioning. The present Opus supervisor version management service may allow the user to easily select multiple site XCM controllers to perform a full commissioning operation. The selection screen may make use of the site groups and categories to enhance the usability of selecting the desired site XCMs. The service may create a background job with the selected site XCMs and allow the user to invoke the job execution. The job execution may sequentially connect to each XCM, detect the XCM type and fully commission the XCM to the new version. The job execution may display the operational steps, statuses and fault conditions. If certain fault conditions occur, the job may attempt a retry of the step. The user may proceed to perform other work with the application while the job execution runs. The user may return to the job status view at a later time to determine the success status. In the previous Opus application, the user may need to manually connect to each individual XCM platform and invoke the commissioning wizard dialog, answer the commissioning options and invoke the operation. The present commissioning dialog may display the operational steps, statuses and fault conditions. The client application may be dedicated to performing the previous operation to a single XCM until completion, which can take much time.

Three, there may be XCM software upgrades. The present Opus supervisor version management service may allow the user to easily select multiple site XCM controllers to perform a software upgrade operation. The selection screen may make use of the site groups and categories to enhance the usability of selecting the desired site XCMs. The present service may create a background job with the selected site XCMs and allow the user to invoke the job execution. The job execution may sequentially connect to each XCM and perform an update of any Opus or Niagara module (jar file) that is out of date from the supervisor to the XCM. The job execution views, retries and availability of the application may be improved as described above in the full commissioning description. In the previous Opus application, the user may need to use the Niagara provisioning feature where the user would select the "Steps to run" option as "Upgrade Out of Date Software", and in the "Stations to include" section, the user would select the target site XCM stations from a long list of station name entries.

Four, there are the XCM station configuration upgrades. The present Opus supervisor version management service may allow the user to easily select multiple site XCM controllers to perform a XCM station configuration upgrade operation. The selection screen may make use of the site groups and categories to enhance the usability of selecting the desired site XCMs. The service may create a background job with the selected site XCMs and allow the user to invoke the job execution. The job setup may also need the user to select one or more pre-installed XCM configuration version upgrade options (robots). The job execution may sequentially connect to each XCM and execute the selected robot or robots within each XCM. The job execution views, retries and availability of the application may be improved as described above in the full commissioning description. In the previous Opus application, the user may need to install the robots into a location within the Opus supervisor, and then the user may use the Niagara provisioning feature where the user would select the "Steps to run" option as "Run Robot", and in the "Stations to include" section, the user may select the target site XCM stations from a long list of station name entries.

The user may utilize the present system and approach as a new feature available in the Opus supervisor and Opus architect applications. The following activities may be followed.

The user may install a present Opus supervisor version. This version of the supervisor may have the present Opus version management service preinstalled with a polling job configured to poll the XCM version information on a daily basis. The job execution may connect to each XCM in the enterprise and retrieve virtually all relative version information and store that information in a local version database file. After this job has executed, the user may see virtually all the versions information from all the deployed site XCM controllers in the Opus version management overview screen.

Once in the versions overview screen, the user may select the option to perform an upgrade. The user may be able to select a previous upgrade job to edit and reuse, or create a new upgrade job. To setup a new upgrade job, the user may easily select the target site XCM controllers by selecting the group, site category, the sites and the XCM to be updated. Once the target XCM's are selected, the user may then be prompted to select the upgrade operation type.

The user may select from the following options, which incorporate full commission, upgrade out of date software and upgrade XCM configuration. Once an operation is selected, the user may submit the job for execution. The user may be shown the currently running job execution steps processing. The user may navigate away from the running job to perform other duties and return later to review statuses. The user may examine upgrade job execution details from the currently running job or from previous job executions. When an upgrade job is submitted to be run, the job operation may dictate the execution path.

First, if the user is performing a full commission job, the supervisor may first attempt to update a XCM license file. The supervisor may first connect to the XCM to retrieve the host ID. With the host ID, the supervisor may attempt to retrieve the license over the internet by contacting a Niagara central license server. If the supervisor has connectivity and is successful, the license file may be installed into the XCM. If the supervisor cannot get the license file server, it will look in a predefined license folder within a supervisor file system structure for the license files. This may be for users running a supervisor on hosts that do not have internet access. In this scenario, the user may need to preload the license files into the local folder structure. Once the license has been updated, the job may detect the XCM type and retrieve the appropriate XCM full commission distribution file. This distribution file may then be submitted to the XCM, triggering the contents within to be installed into the XCM. The detailed operation steps taken during the job execution may be stored in a history file to be available for viewing.

Second, if the user has submitted an upgrade out of date software job, the supervisor may invoke the execution path where all software modules installed in the supervisor that are the same as the out of date modules in the XCM, will be sent to the XCM. This may assume that newly updated modules are installed into the supervisor prior to running this operation.

Third, if the user has submitted an upgrade XCM configuration job, the supervisor may invoke the execution path where all selected robots specified in the job are sent to the XCM and executed. These robots may perform XCM station configuration changes.

In virtually all job operation executions, the detailed operation steps taken during the job execution may be stored in a history file to be available for viewing. Also, when an XCM upgrade operation is complete the XCM may be rebooted.

Figure 1A:
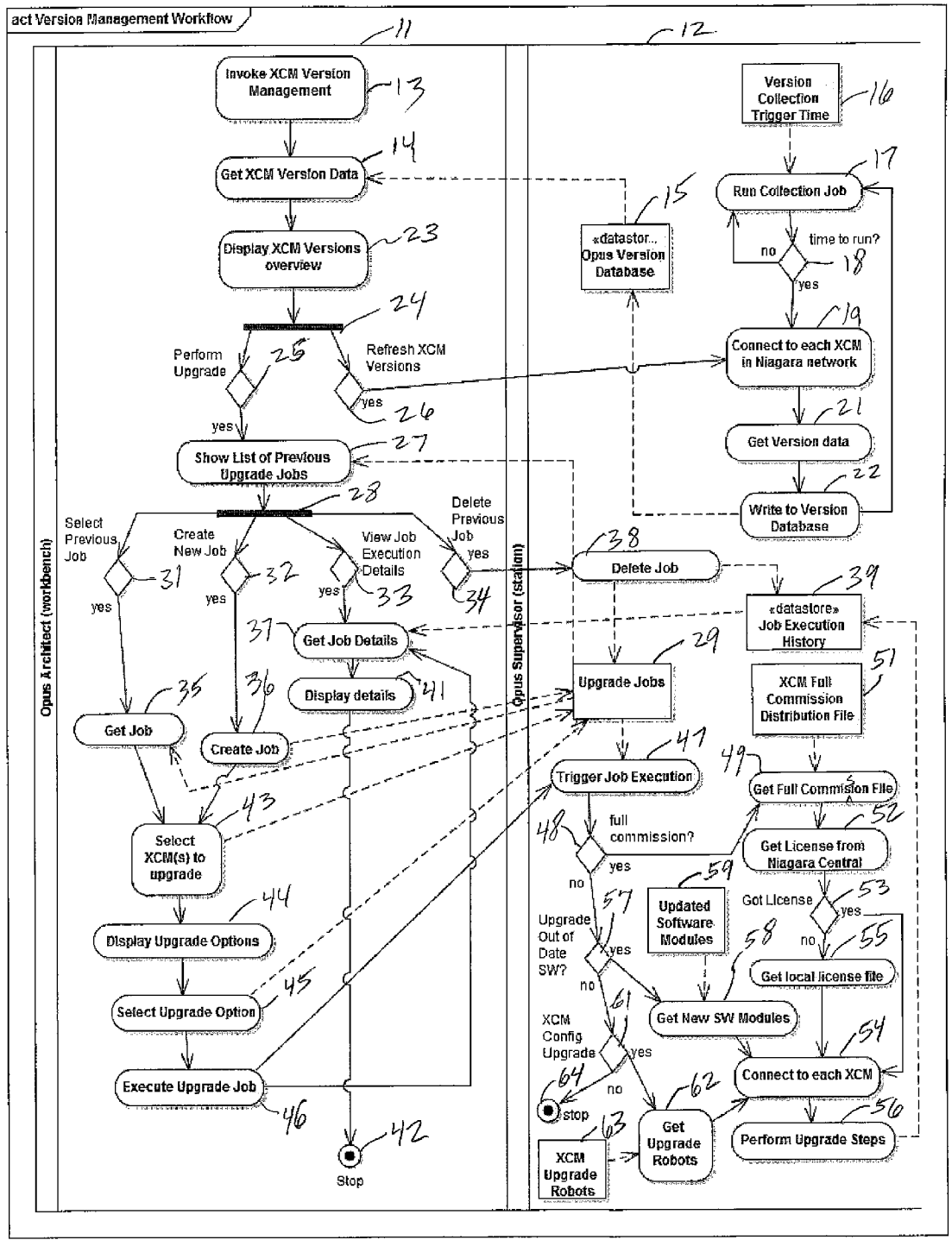
FIG. 1a is a diagram of a version management workflow activity.

FIG. 1a is a diagram of a version management workflow activity. The diagram may incorporate an Opus™ architect (workbench) 11 and an Opus supervisor (station) 12. Workbench 11 and station 12 may interact with each other as the workflow is progressed through. Items, steps, actions, objects or other things may be indicated at symbols having a numerical designation. At symbol 13 may be XCM version management of workbench 11. XCM version data may then be gotten at symbol 14. The version data may be from an Opus version database of a data store at symbol 15 of station 12.

In station 12, a version collection trigger time may occur at symbol 16. A collection job may be run at symbol 17. A question is whether it is time to run or not at symbol 18. If no, then a return to run a collection job at symbol 17 may occur. If yes, then there is a proceeding from symbol 18 to a symbol 19 where there a connecting to each XCM in a Niagara™ network. Version data may then be gotten at symbol 21. A version database may be written to at symbol 22. Data from symbol 22 may go to the version database at symbol 15. The approach may return from symbol 22 to symbol 17 to be rerun.

After symbol 14 in workbench 11, an XCM versions overview may be displayed at symbol 23. Two actions that perform upgrade and refresh XCM versions may be distinguished at symbol 24, and asked at symbols 25 and 26, respectively. From symbol 26, an entry of refresh XCM versions may go to symbol 19 where there can be a connect to each XCM in a Niagara network.

A list of previous upgrade jobs may be shown at symbol 27 and split into groups at symbol 28. Input about upgrade jobs at a symbol 29 in station 11 may go to the list of previous upgrade jobs at symbol 27. Questions at workbench 11 about whether to proceed with respective groups may be whether to select a previous job at a symbol 31, create a new job at symbol 32, view job execution details at symbol 33, and delete previous job at symbol 34. From symbol 31 with a yes, a job may be got at symbol 35. From symbol 32 with a yes, a job may be created at symbol 36. From symbol 33 with a yes, job details may be got at symbol 37. From symbol 34 with a yes, the job may be deleted at symbol 38. Information from symbol 38 may go to a data store of job execution history at symbol 39.

Information about upgrade jobs at symbol 29 may go to get job at symbol 35. Information from create job at symbol 36 may go to symbol 29. Information about job execution history at a data store of symbol 39 may go to symbol 37 for getting job details. At symbol 41, job details may be displayed, after which this flow may stop at symbol 42.

From get job at symbol 35 and create job at symbol 36, XCM(s) may selected to upgrade at symbol 43. Information of symbol 42 may go to symbol 29 for upgrade jobs. Going from symbol 43 to symbol 44 may occur to display upgrade options. An upgrade option may be selected at symbol 45, and an upgrade job may be executed at symbol 46. Information from symbol 45 on the select an upgrade option may go to upgrade jobs at symbol 29. After symbol 46, job details may be got at symbol 37 at workbench 11 and job execution may be triggered at symbol 47 at station 12.

After symbol 47, a question about full commission may be asked at symbol 48. If the answer is yes, then a full commission file may be got at symbol 49. Information from an XCM full commission distribution file at symbol 51 may go to symbol 49. After symbol 49, a license from Niagara central at symbol 52 may inquired. If the license is got as asked at symbol 53, then a connection may be made to each XCM at symbol 54. If a license is not got as asked at symbol 53, then a local license file is got at symbol 55. From symbol 55, a connection to each XCM may be made at symbol 54. From symbol 54, upgrade steps may be performed at symbol 56. Information may go from symbol 56 to the data store at symbol 39 having a job execution history.

Back to symbol 48, if an answer to the question about whether there is a full commission is no, then a question about whether an upgrade of out of date software is asked at symbol 57. If the answer is yes, then new software modules may be got at symbol 58. Update software modules may be provided from symbol 59 to symbol 58. Subsequent to symbol 58, a connection may be made to each XCM at symbol 54. From symbol 54, upgrade steps may be performed at symbol 56.

Back to symbol 57, if an answer to the question about whether an upgrade is out of date software is no, then a question about whether there is an XCM configuration upgrade at symbol 61 is yes, then upgrade robots may be got at symbol 62. Upgrade robots or information about them may be got from symbol 63. After symbol 62, a connection may be made to each XCM at symbol 54. Then upgrade steps may be performed at symbol 56. Information about the upgrade steps may go to a data store of job execution history at symbol 39.

Back to symbol 61, if an answer to the question about whether there is an XCM configuration upgrade is no, then the flow may be stopped at symbol 64.

Figure 2:
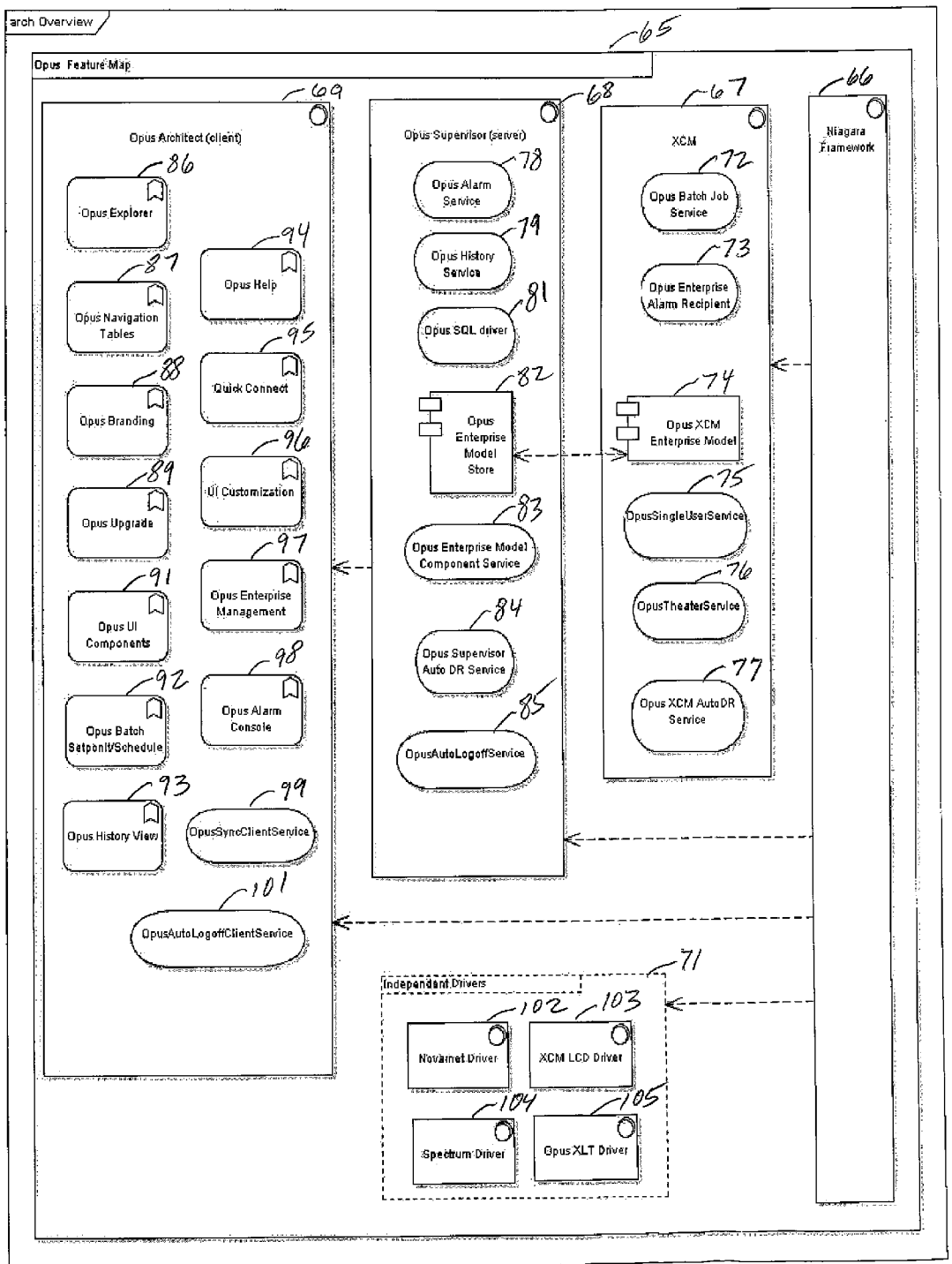
FIG. 2 is a diagram of an architectural overview with an Opus feature map.

FIG. 2 is a diagram of an architectural overview with an Opus feature map 65. From a Niagara framework 66 may be an XCM 67, an Opus supervisor (server) 68, an Opus architect (client) 69, and independent drivers 71, as indicated by dashed lines with arrow ends. XCM 67 may incorporate a batch job service 72, an enterprise alarm recipient 73, an XCM enterprise model 74, a single use service 75, a theater service 76 and an XCM auto DR service 77. Supervisor (server) 68 may incorporate an alarm service 78, a history service 79, an SQL driver 81, an enterprise model store 82, an enterprise model component service 83, supervisor auto DR service 84 and an auto r log off service 85. The XCM enterprise model 74 and enterprise model store may interact with each other.

Architect (client) 69 may incorporate an explorer 86, navigation tables 87, branding 88, upgrade 89, UI components 91, batch setpoint/schedule 92, history view 93, help 94, quick connect 95, UI customization 96, enterprise management 97, alarm console 98, sync client service 99 and auto log off client service 101.

Independent drivers 71 may incorporate Novar™ net driver 102, XCM LCD driver 103, spectrum driver 104, and XLT driver 105.

Figure 6:
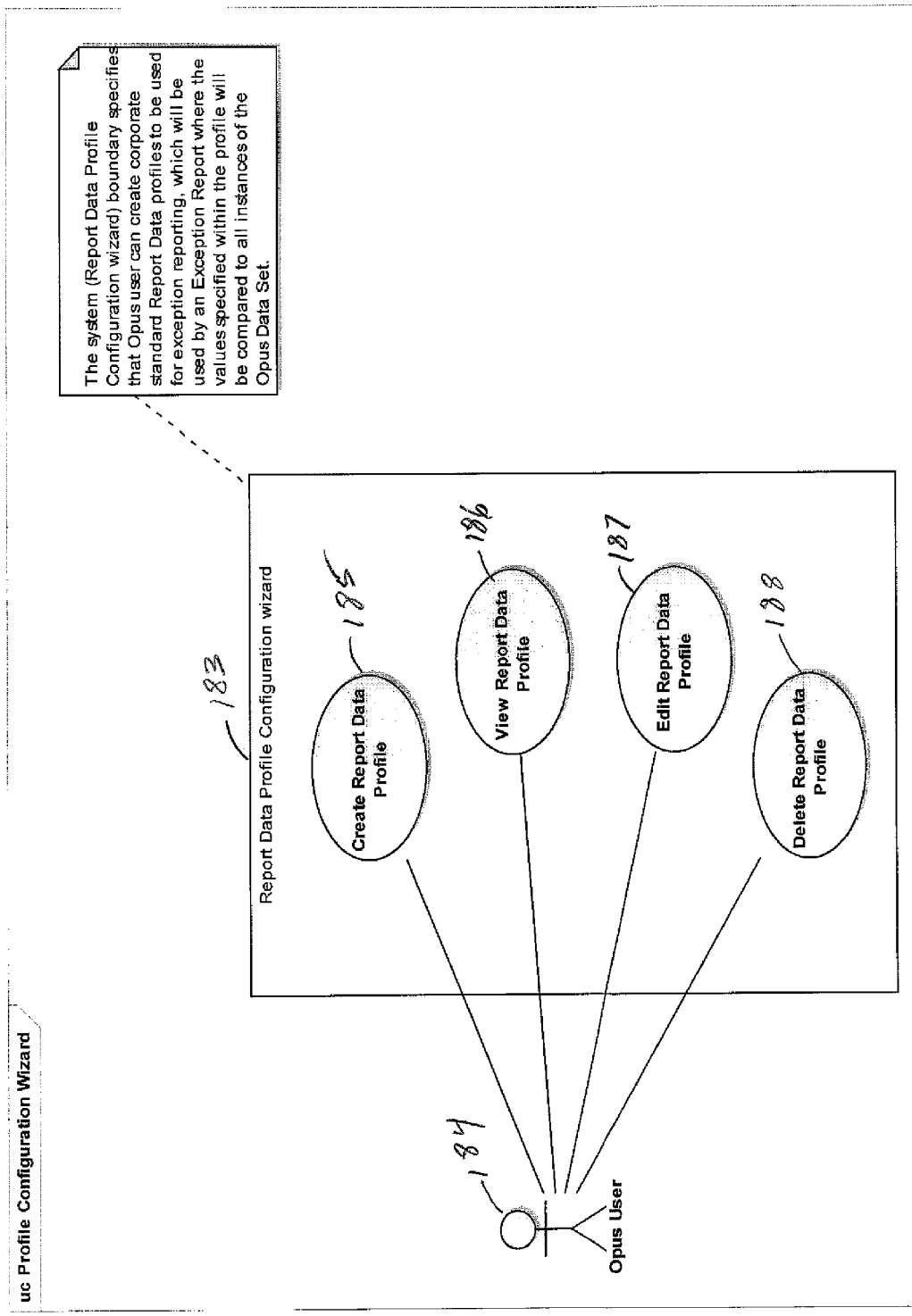
FIG. 6 is a diagram of a profile configuration wizard.

A user of a profile configuration wizard in a diagram of FIG. 6 may specify data points that are to be pulled from XCMS/backup files. A set of related data points and containers may collectively be called a dataset. Each dataset may have a base component, datapoints, and containers relative to the base component. During data polling activity, the specified datasets may be retrieved from XCMS/backup files based on an option that user 106 selects. Pre-defined datasets may be treated as read-only. User 106 may create a custom dataset by selecting a base component and datapoints/containers relative to the base component. User 106 may also edit/delete the custom dataset.

Figure 3:
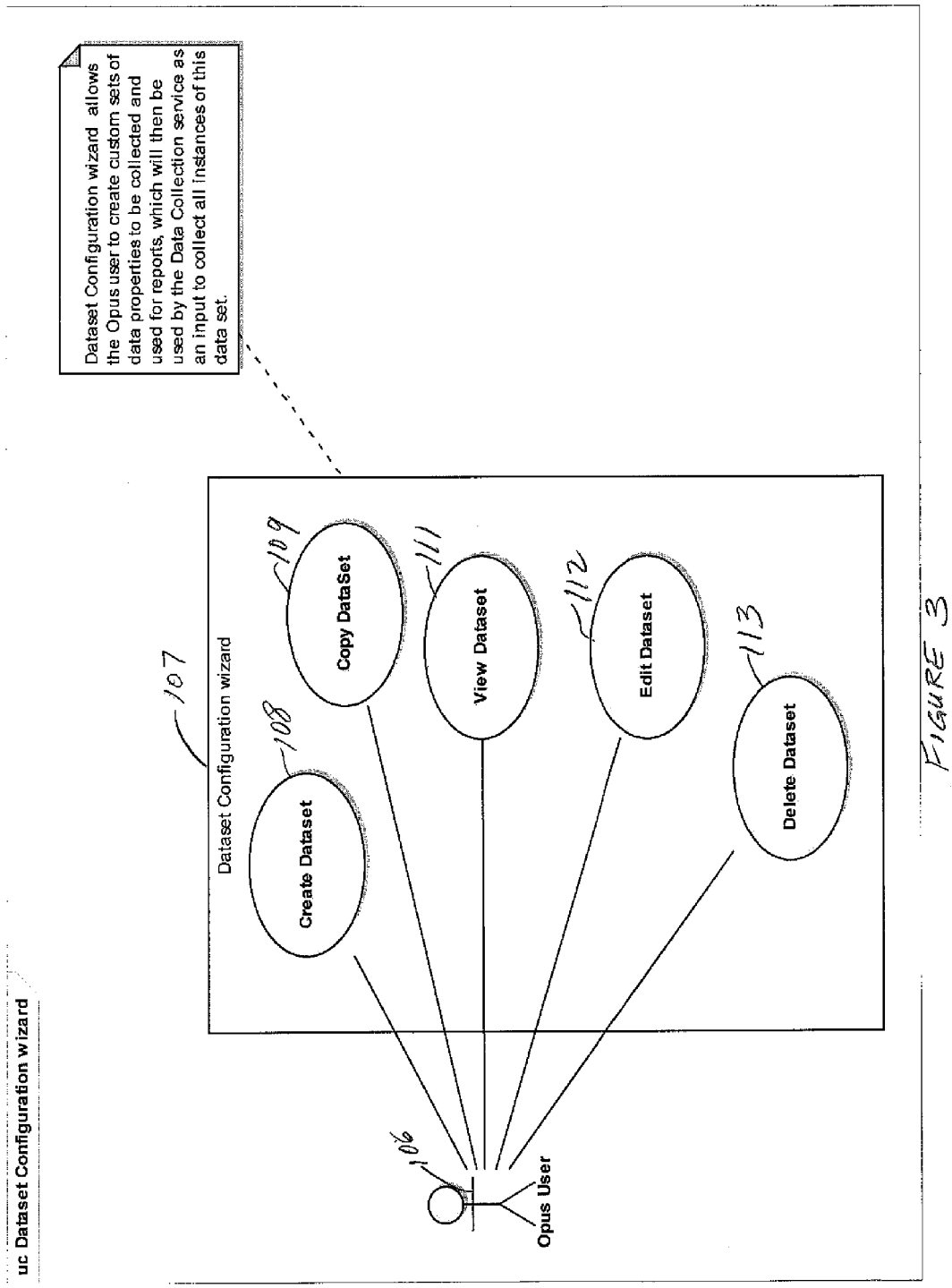
FIG. 3 is a diagram of a dataset configuration wizard.

FIG. 3 is a diagram of a dataset configuration wizard 107. User 106 may create a dataset, copy the dataset, view the dataset, edit the dataset and delete the dataset at symbols 108, 109, 111, 112 and 113, respectively. Dataset configuration wizard 107 may allow user 106 to create custom sets of data properties to be collected and used from reports, which can be used by a data collection service as an input to collect all instances of the dataset.

User 106 may be able to select a predefined dataset and view virtually all the data points and containers associated with the dataset. User 106 may be able to create a dataset by selecting a base component and relative data points and containers. User 106 may be able to edit/delete a custom dataset. User 106 may be able to copy an existing dataset and create a new one. Predefined dataset information may be stored in data pool config.XML under the stations resources/data poll location. The same way user defined dataset information may be saved in custom data poll config.XML. The XML may be read in an application using config/manager interface. In this case, the configXMLmanager's instance may have Opus to retrieve datasets.

A supervisor wizard may be created. The wizard may list all available predefined and user defined datasets. Predefined datasets may be read-only. User 106 may edit/delete a custom dataset. To create a custom dataset, user may select a base component and the data points relative to the base component. This may be named and saved. On editing a dataset, user on our six may be able to remove soil/add a data point into the existing dataset.

Figure 4:
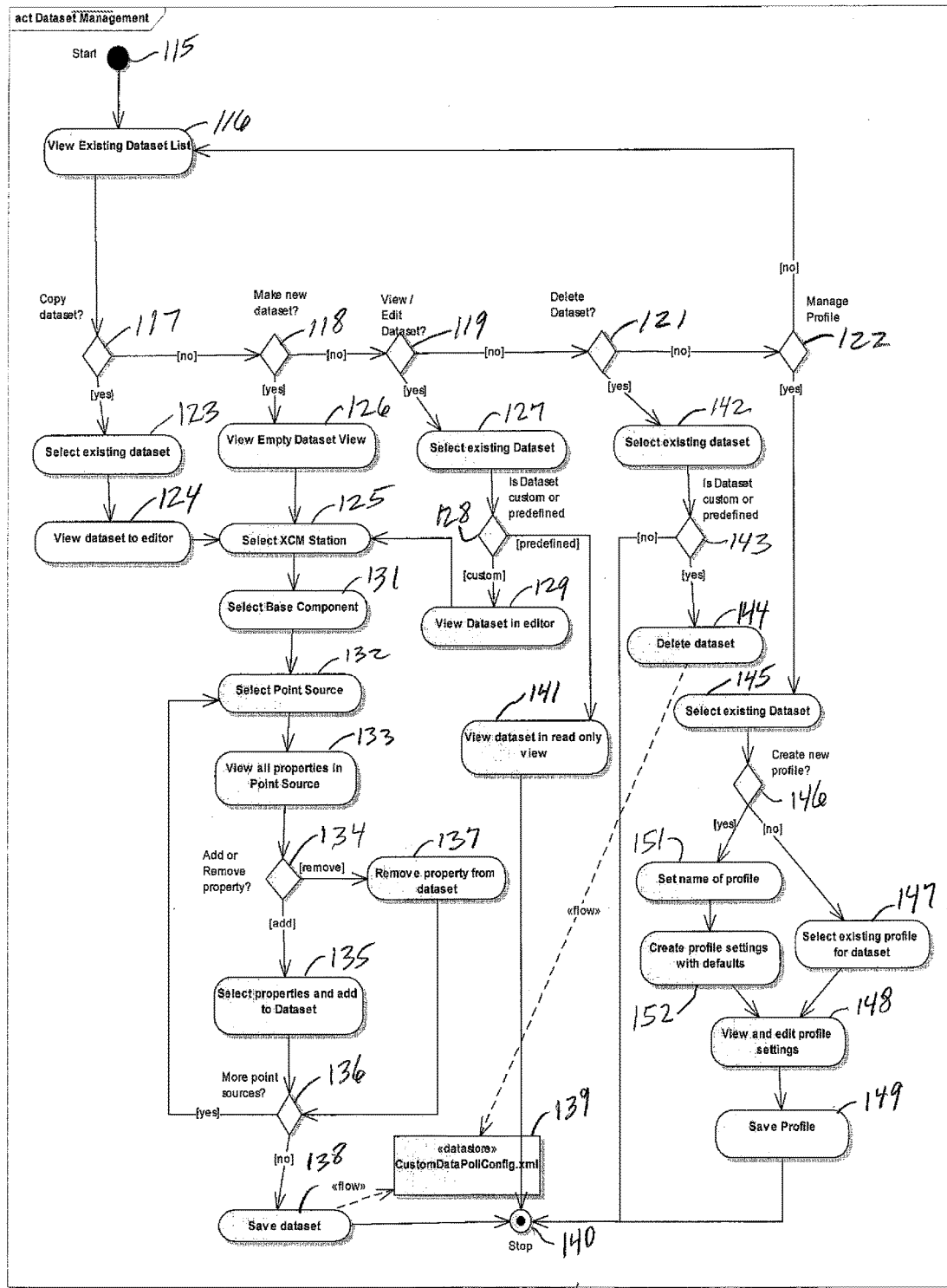
FIG. 4 is a diagram of a dataset management arrangement.

FIG. 4 is a diagram of a dataset management arrangement. A start may begin at symbol 115. An existing dataset list may be viewed at symbol 116. A question at symbol 117 may ask whether the dataset is to be copied. If the answer is no, then go to symbol 118 that asks whether a new set is to be made. If the question to that is no, then go to symbol 119 that asks the question whether to view/edit dataset. If the answer is no, then go to symbol 121 that asks whether the dataset is to be deleted. If the answer is no, then go to symbol 122 and asks whether the profile is to be managed. If the answer is no, then go back to symbol 116 where the existing dataset list may be viewed.

If the answer to the question in symbol 117 is yes, then the dataset is to be copied. Then one may go to symbol 123 where an existing dataset is selected. At symbol 124, dataset editor may be referred to. Then at symbol 125, XCM station may be selected. The question at symbol 118, which asks if a new dataset is to be made, may be answered as yes. Then one may go to symbol 126 where there is an empty dataset is to be viewed. Then an XCM station may be selected at symbol 125. If the question whether to view/edit dataset is answered as yes at symbol 119, then go to symbol 127 where existing dataset is selected. Then a question asked at symbol 128 is whether the dataset is custom or predefined. If the answer is custom, then one may view the dataset in editor at symbol 129. Then one may go to symbol 125 to select an XCM station.

After symbol 125, one may go to symbol 131 where a base component is selected. Next a point source may be selected at symbol 132. All properties in a point source may be viewed at symbol 133. A question at symbol 134 may ask whether to add or remove a property. If the answer is to add a property, then one may go to symbol 135 and select a property or properties and add them to dataset. At symbol 136, a question asked may be whether there are more point sources.

If the answer to the question at symbol 134 is to remove a property, then one may go to symbol 137 and remove the property from a dataset. At symbol 136, there may be a question asked if there are more point sources. If the question has an answer of yes, then one may go to symbol 132 to select a point source. The items may be repeated in symbols 133, 134, 135, 137 and 136. If an answer to the question symbol 136 if whether there are more point sources is no, then at symbol 138 one may save the dataset. Information for the dataset may flow to symbol 139 where the data store may add to a custom data poll configuration.XML. After a dataset saving at symbol 138, then the flow may stop at symbol 140.

If an answer to the question at symbol 128 is that the dataset is predefined, then one may go to symbol 141 where the dataset in the read-only view is viewed. After symbol 141, the flow may stop at symbol 140.

If the answer to the question at symbol 121 that the dataset is to be deleted, then one may go to symbol 142 and select an existing dataset. At symbol 143, a question is whether the existing dataset is custom or predefined may be asked. If an answer to the question is yes, then one may go to symbol 144 and delete the dataset. If the answer to the question at symbol 143 is no, then one may stop at symbol 140. Information about the delete dataset may go from symbol 144 to the data store at symbol 139.

If an answer to the question at symbol 122 whether to manage the profile is answered as yes, then one may go to symbol 145 to select an existing dataset. At symbol 146, a question may be whether to create a new profile for the selected existing dataset. If the question at symbol 146 has an answer of no, then one may go to symbol 147 and select an existing profile for the dataset, go to symbol 148 and view and edit profile settings, and then save the profile at symbol 149. One may stop the flow at symbol 140. If an answer to the question of creating a new profile at symbol 146 is yes, then one may go to symbol 151 and set a name of the profile, create profile settings with defaults at symbol 152, and then view and edit profile settings at symbol 148. The profile may be saved at symbol 149 and the flow may stop at symbol 140.

Figure 5:
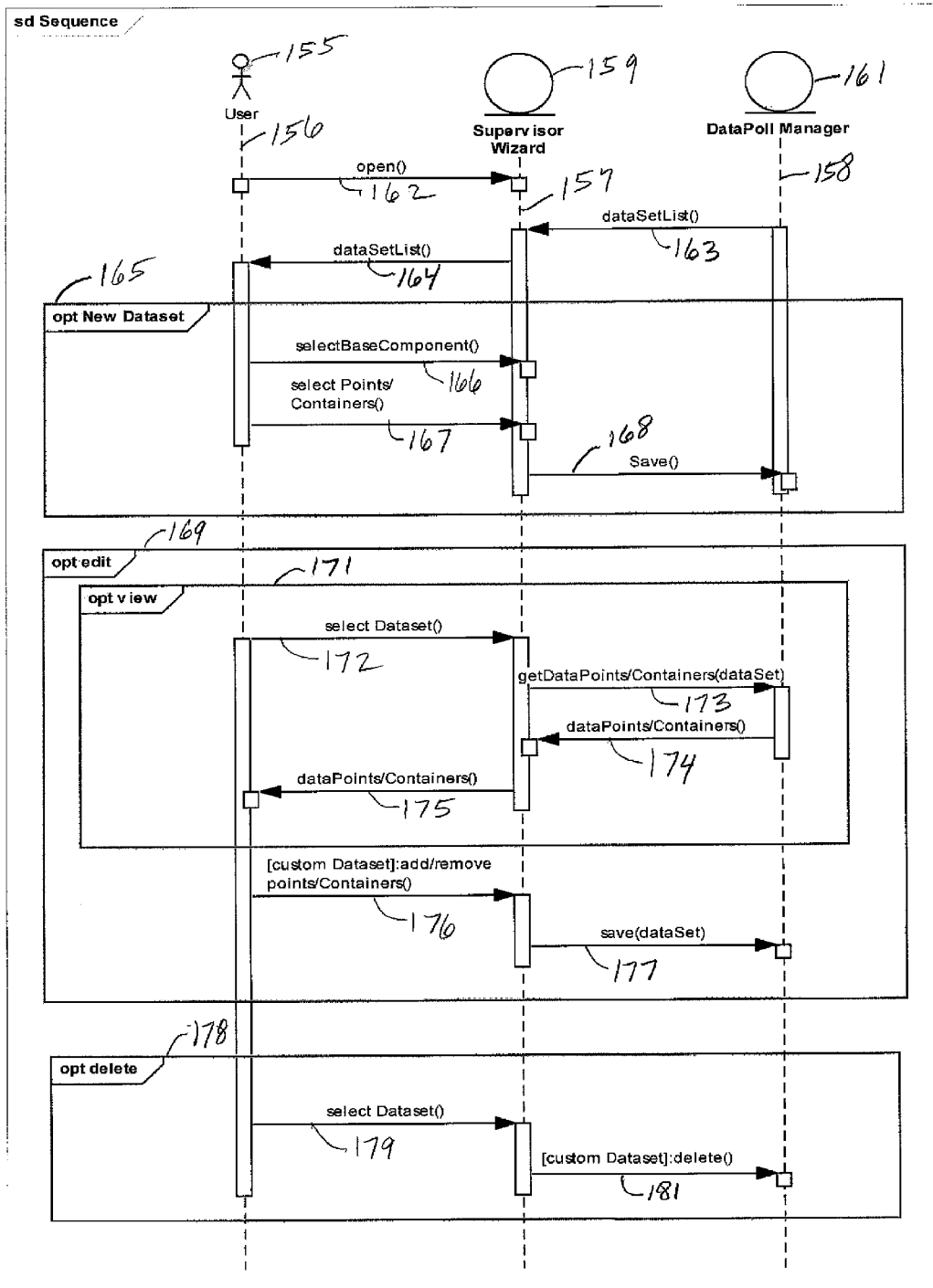
FIG. 5 is a diagram of a sequence involving a supervisor wizard and data poll manager.

FIG. 5 is a diagram of a sequence involving a supervisor wizard and data poll manager. A user 155 may be situated at place 156, a supervisor wizard 159 may be situated at place 157, and a data poll manager 161 may be situated at place 158. The places may be represented by vertical lines in the Figure. From user 155 at place 156, an open along line 164 may go to wizard 159 at place 157. From dataflow manager 161 at place 158, the dataset may go along line 163 to place 157. The dataset may go along line 164 from place 159 to place 156.

In new dataset area 165, a select base component may go from place 156 along line 166 to place 157. Select points/containers may go along line 167 from place 156 to place 157. From place 157, a save may go along line 168 to place 158.

In view area 171 of edit area 169, a select dataset may go from place 156 to 157 along line 172. A get data points/containers dataset may go along line 173 from place 157 to place 158. Data points/containers may go from place 158 to 157 along line 174. Data points/containers may go along line 175 from place 157 to place 156. Outside of view area 171 but inside edit area 169, the custom dataset add/remove points/containers may go from place 156 along line 176 to place 157. A save dataset may go from place 157 to place 158 along line 177. In a delete area 178, select dataset may go from place 156 to place 157 along line 179. A custom dataset delete may go from place 157 to place 158 along line 181.

A profile may be a set of standard setpoint values for a dataset. A user may create a profile by assigning a standard data point value to each point in the dataset. A dataset may have multiple profiles created by the user.

FIG. 6 shows a profile configuration wizard in area 183. User 184 may create report data profile at symbol 187, view report data profile at symbol 186, edit report data profile at symbol 187 and delete report data profile at symbol 188. These actions may be encompassed by the report data profile configuration wizard as shown in area 183. The system (report data profile configuration wizard) boundary may specify that user 184 may create corporate standard report data profiles to be used for exception reporting, which may be used for an exception report where the values specified within the profile may be compared to virtually all instances of the dataset. User 184 may be able to create data profiles for each dataset. Each data profile may be edited/deleted. The profiles may be stored in supervisor station's services. User 184 may need to check or select a dataset to create a profile. After selecting a dataset, user may give standard values for each point in the dataset. User 184 may also edit/delete a profile.

Figure 7:
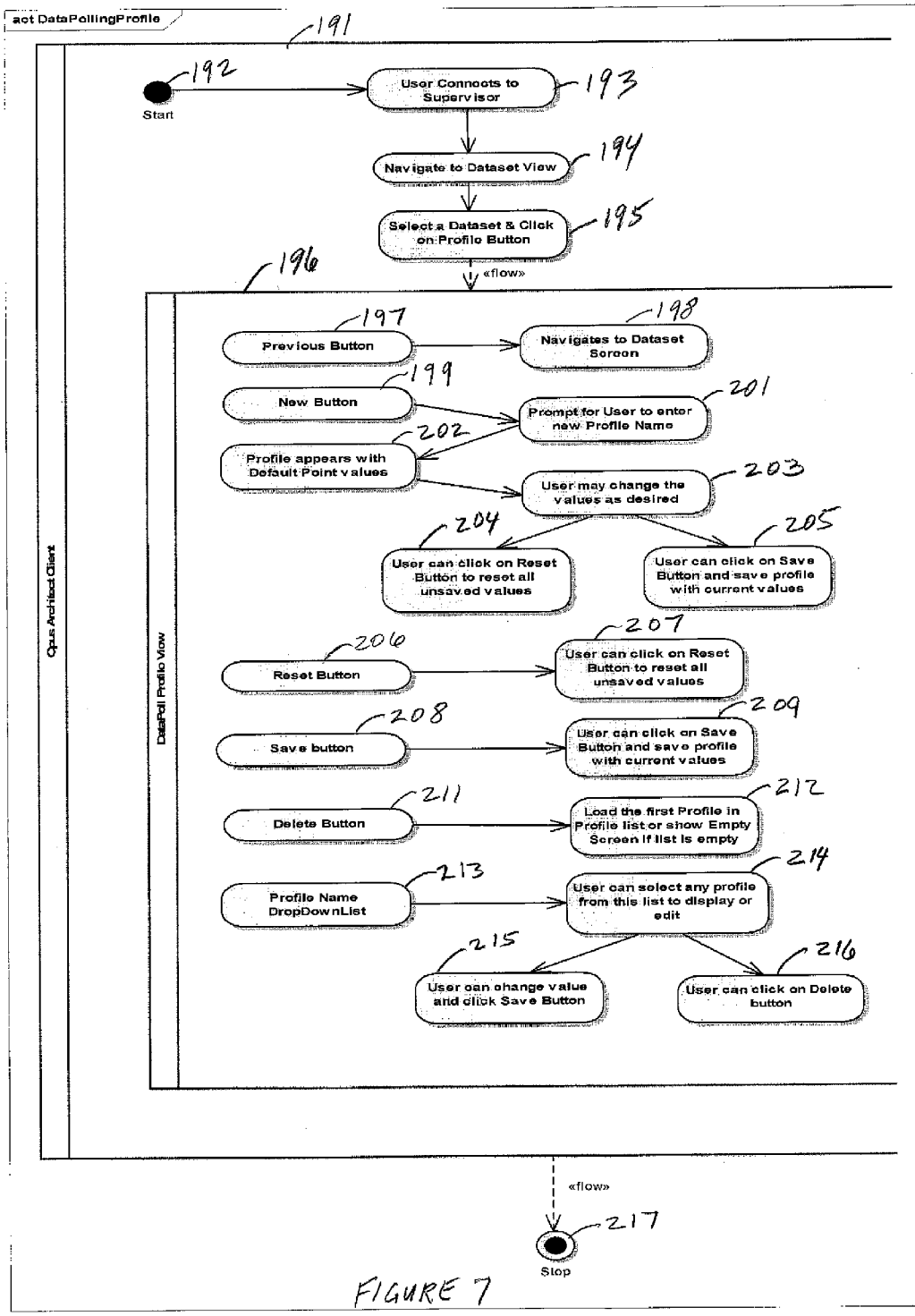
FIG. 7 is a diagram of the data polling profile.

FIG. 7 is a diagram of the data polling profile. At the start symbol 192, a user may connect to a supervisor at symbol 193. At symbol 194, the user may navigate to a dataset view. User may, on a profile button at symbol 195, go from symbol 195 to an area 196 of the data poll profile view. Actions for various buttons may be shown within in area 196. A previous button of symbol 197 may result in a navigating to a dataset screen according to symbol 198. A new button of symbol 199 may be a prompt for a user to enter a new profile name as indicated by symbol 201 and then the profile may appear with default point values as indicated by symbol 202. The user may change the values as desired as indicated by symbol 203. The user may click on a reset button to reset virtually all unsaved values as indicated by symbol 204 and/or the user may click on a save button to save the profile with the current values as indicated by symbol 205.

A reset button of symbol 206 may result in resetting virtually all unsaved values by the user as indicated by symbol 207. A save button at symbol 208 may result in saving a profile with current values as indicated at symbol 209. A delete button of symbol 211 may result in loading the first profile in the profile list or showing an empty screen if the list is empty as indicated by symbol 212. A button for a profile name drop down list of symbol 213 may result in one being able to select virtually any profile from the list to display or edit as indicated in symbol 214. Symbol 214 may be elaborated at symbol 215 in that one may change a value and click a save button. Symbol 214 may also be elaborated at symbol 216 in that one may click on a delete button. The flow of view 196 and client 191 may stop at symbol 217.

Figure 8:
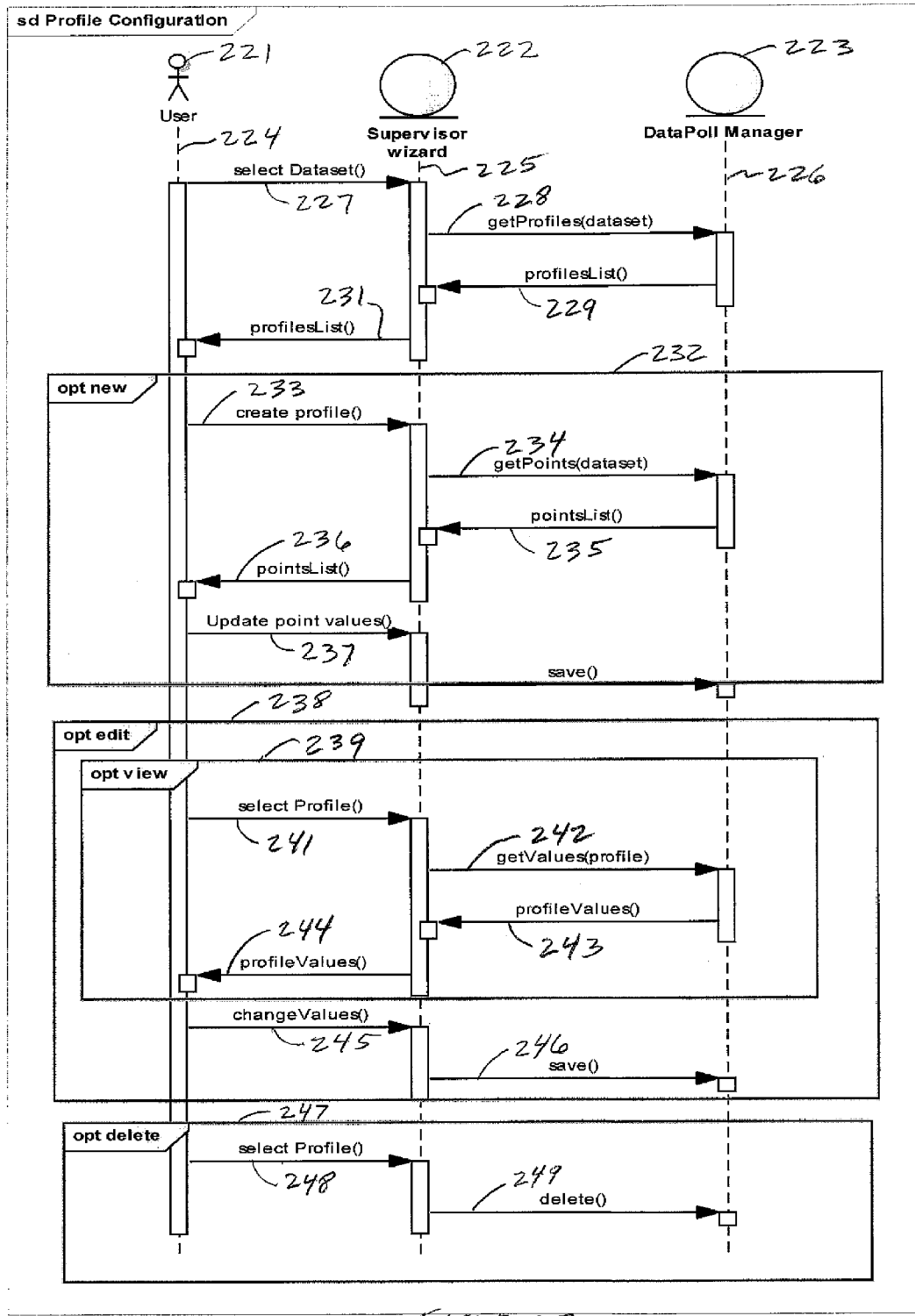
FIG. 8 is a diagram of profile configuration.

FIG. 8 is a diagram of profile configuration. A user 221 may be associated with a place 224. A supervisor wizard may be 222 may be associated with place 225. A data poll manager 223 may be associated with place 226. Places 224, 225 and 226 may be represented by vertical lines. A select dataset may follow a line 227 from place to 224 to 225. Profiles (dataset) may be got along line 228 from place 225 to place 226. A profiles list may go from place to 226 along line to 229 to place 225. The profiles list may move from place 225 along line 231 to place 224.

Inside a new area 232, a create profile 233 may follow a line 233 from place 224 to place 225. From place 225 to place 226, a get points (dataset) may go along line 234. Then from place 226, points list may go along line 235 to place 225. The points list may go from place 225 along line 236 to place 224. From place 224, update point values may go along line 237 to place 225. In a view area 239 within edit area 238, from place 224 select profiles may go from place 224 to place 225. A get values (profile) may go from place 225 along line 242 to place 226. From place 226 profile values go to place 225 along line 243. Profile values may go from place 225 along line 244 to place 224. Within edit area 238 but outside of area 239, change values along line 245 may go from place 224 to place 225. A save along line 246 may go from place 225 to place 226. Outside of edit area 238 and inside of a delete area 247, a select profile may follow a line 248 from place 224 to place 225. A delete may follow a line 249 from place 225 to place 226.

A default data poll job may include virtually all of the predefined datasets and collect from XCM/backup files without any filter. A user may need to enable/disable some of the datasets for the default job. The default job, while running, may only collect enabled datasets. A manual trigger mechanism may also be provided. The user may create a custom job by selecting a set of XCM and the datasets. These jobs may be run immediately or be scheduled. The user may be able to view the logs of each job.

Figure 9:
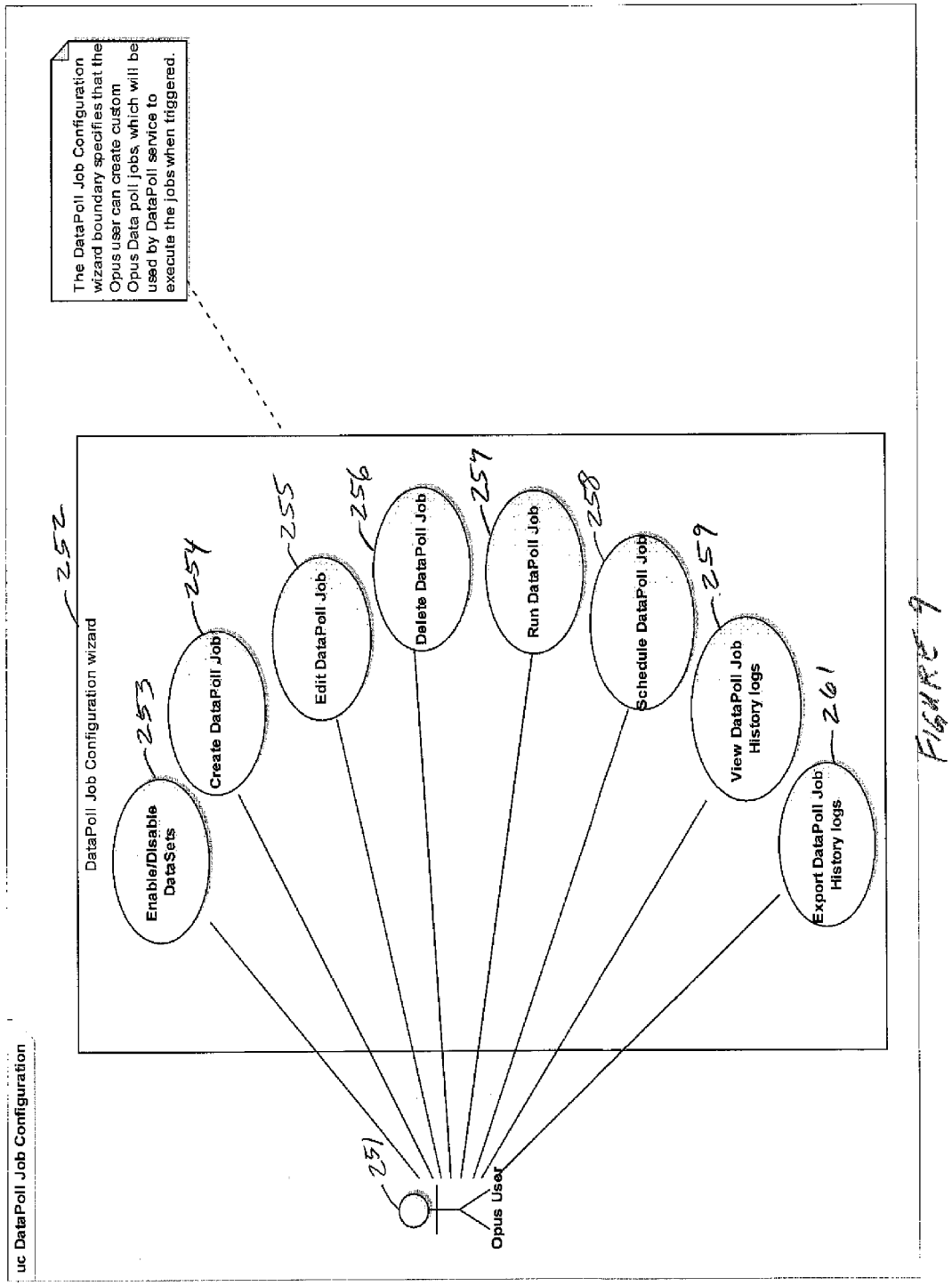
FIG. 9 is a diagram of a data poll job configuration wizard.

FIG. 9 is a diagram of a data poll job configuration wizard 252. The data poll job configuration wizard boundary may specify that a user can create custom Opus data poll jobs, which will be used by a data poll service to execute the jobs when triggered.

User 251 may enable/disable datasets at symbol 253, create a data poll job at symbol 254, edit the data poll job at symbol 255, run the data poll job at symbol 257, schedule the data poll job at symbol 258, view data poll job history logs at symbol 259, and export data poll job history logs at symbol 261.

A wizard may allow a user to enable/disable defined datasets. A schedule/manual trigger mechanism may be provided to run the default job. A custom job may be created/edited/deleted. One may run/schedule a data poll job and create a bog file with collected data points. Also, data poll job history logs may be viewed/exported.

The jobs may be stored in the station's global services folder under jobs. This may be done so that the schedule trigger is able to pick it up to run as station jobs. The individual jobs may have settings to choose a type of logging for the collection job execution steps.

A collection screen may have user interface wizard screen classes used for navigation for managing a job. For example, a collection configuration screen may list EMD data for filter selection in running the job.

A user may select/deselect a set of pre-defined datasets to include in the default data poll job. The job may be triggered or scheduled a from a data poll service property sheet. On running the default job, just the enabled datasets may be retrieved from XCMS/backup files. The user may create a custom job by selecting group, category, site, XCM and dataset. The user may run the job immediately or can schedule it. A history logs may be maintained for each job. The user may be provided an option to view the logs.

Figure 10:
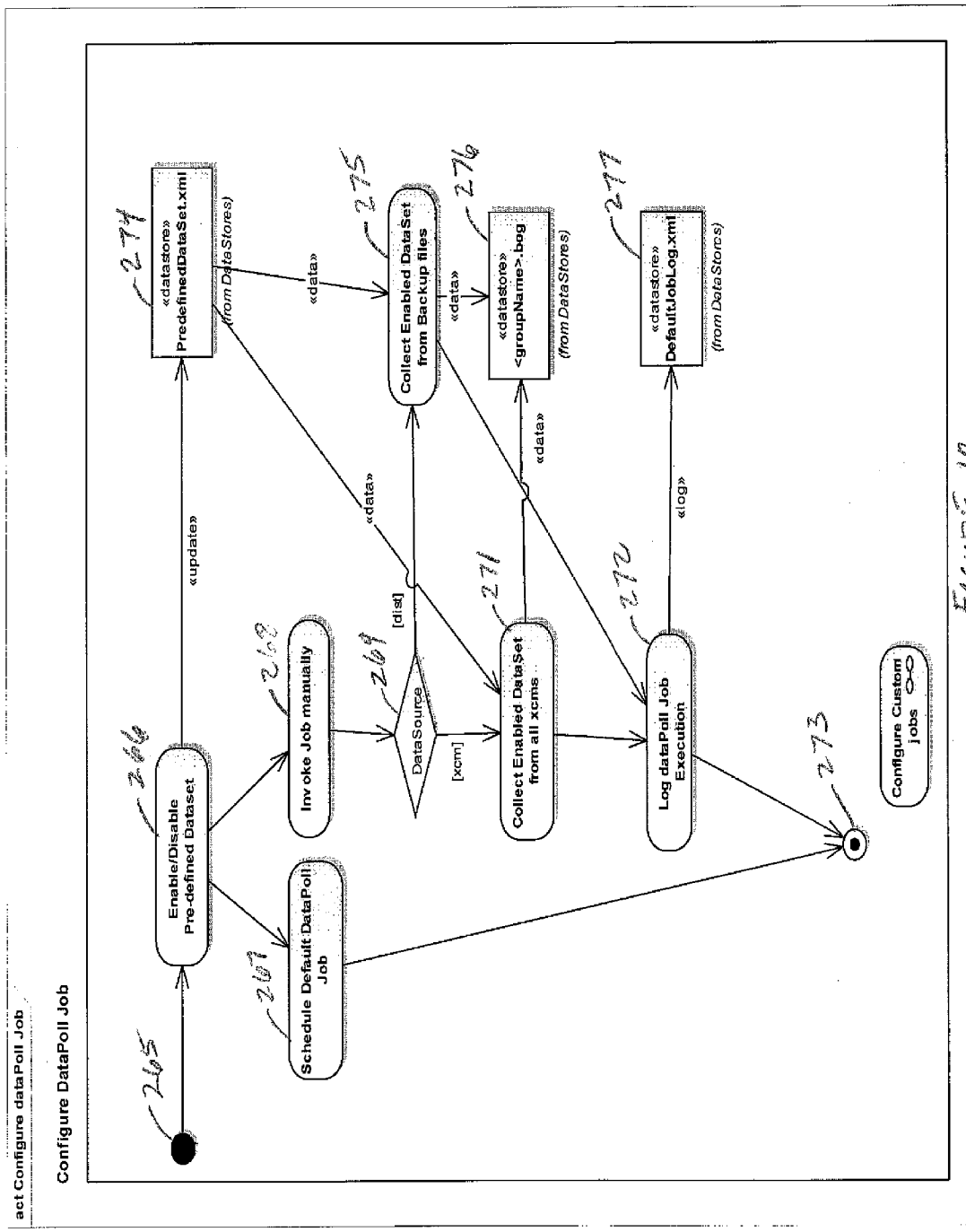
FIG. 10 is a diagram of a configure data poll job.

FIG. 10 is a diagram of a configure data poll job. Symbol 266 may indicate an enable/disable predefined dataset. From symbol 266 one may go to symbol 267 that indicate a schedule default data poll job. After at symbol 267 one may end at symbol 273. Also from symbol 266 one may go to symbol 268 and invoke the job manually. After symbol 268, a data source symbol 269 may be a junction from which one may go a dist (distribution) route towards symbol 275 to collect enabled datasets from backup files or XCM route to symbol 271 to collect enabled datasets from all XCM's. Data may be provided from symbol 271 to a data store 276 (group name).bog. After symbol 271, one may log data poll job execution at symbol 272. After symbol 272, one may end at symbol 273. One may from symbol 272 log into a data store at default job log.XML at symbol 277.

Updates may go from symbol 266 to a data store at symbol 274 (pre-defined dataset.XML). From symbol 274, data may go to symbol 271 and data may go to symbol 275 for collect enabled dataset from backup files. Dist may go from data source of symbol 269 to symbol 275. From symbol 275 data may go to symbol 276 for data store at group name.bog.

Figure 11:
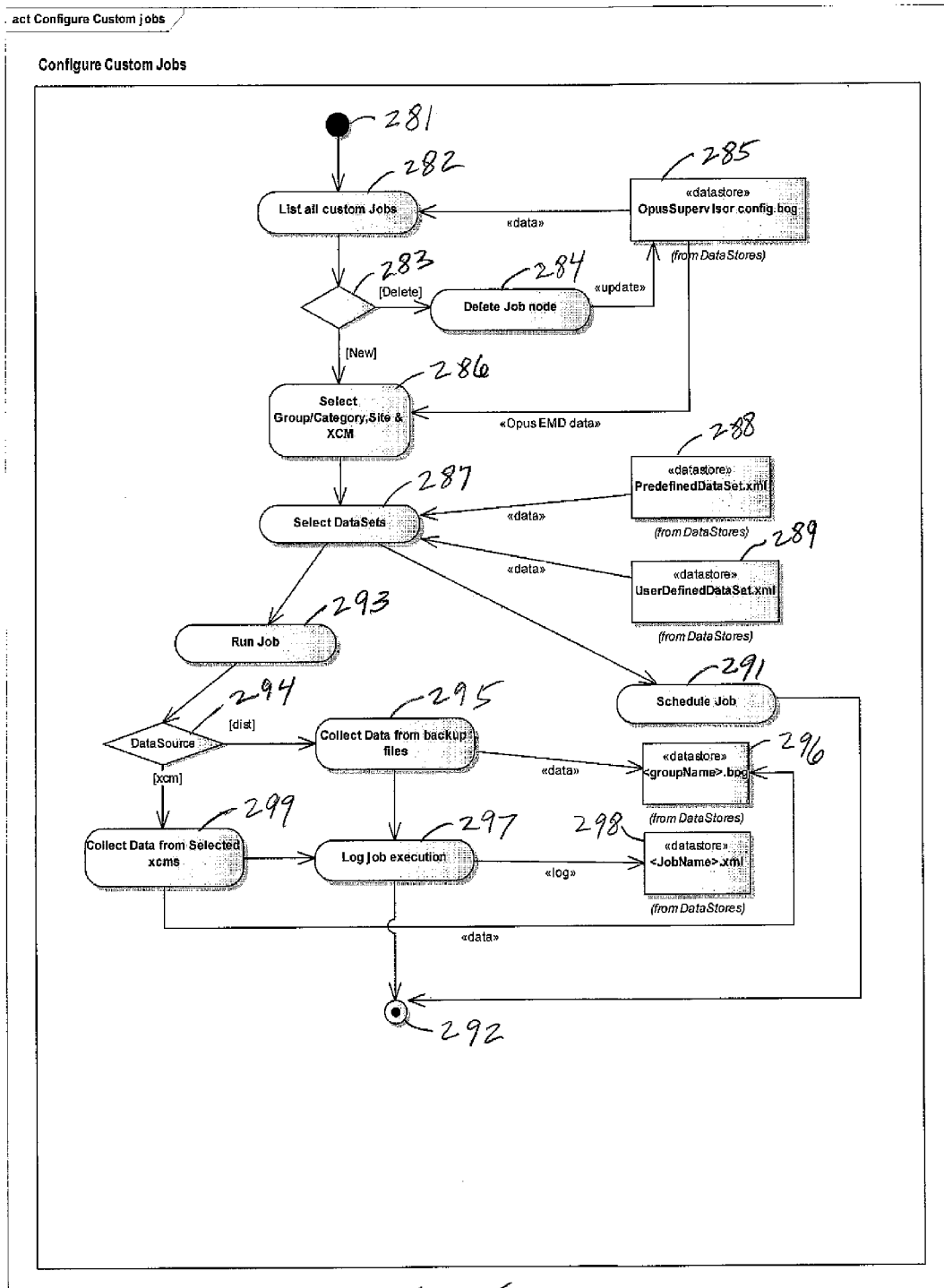
FIG. 11 is a diagram for configuring custom jobs.

FIG. 11 is a diagram for configuring custom jobs. From a start at symbol 281, one may go to symbol 282 which lists custom jobs. An Opus supervisor config.bog data store at symbol 285 may provide data to symbol 282. After symbol 282, a decision may arise out symbol 283 to either pick the delete job node at symbol 284 and an update may go from symbol 284 to data store at symbol 285. If the decision at symbol 283 is new, then one may go to symbol 286 were group/category, site and XCM are selected. Opus EMD data may come from data store at symbol 285 to symbol 286. At symbol 287 after symbol 286, data may be received from data store at symbol 288 for predefined dataset.XML. Data may also come from the data store at symbol 289 for user defined dataset.XML. After symbol 287, a job may be scheduled at symbol 291. After symbol 291, the flow may terminate at symbol 292. Another approach after symbol 287 for select datasets may go to symbol 293 for run job. Then one may go to data source at symbol 294 that has a dist to symbol 295 for a collect data from backup files. Data may go from symbol 295 to data store at symbol 296 for group name.bog. Information may go to log job execution at symbol 297 from symbol 295. A log may be provided to symbol 298 data store for job name.XML. Log job execution may continue on to symbol 292 which is an endpoint. From data source at 294 one may also go the XCM route to symbol 299 for collect data from selected XCM's. Data may go from symbol 299 to data store at symbol 296.

Figure 12:
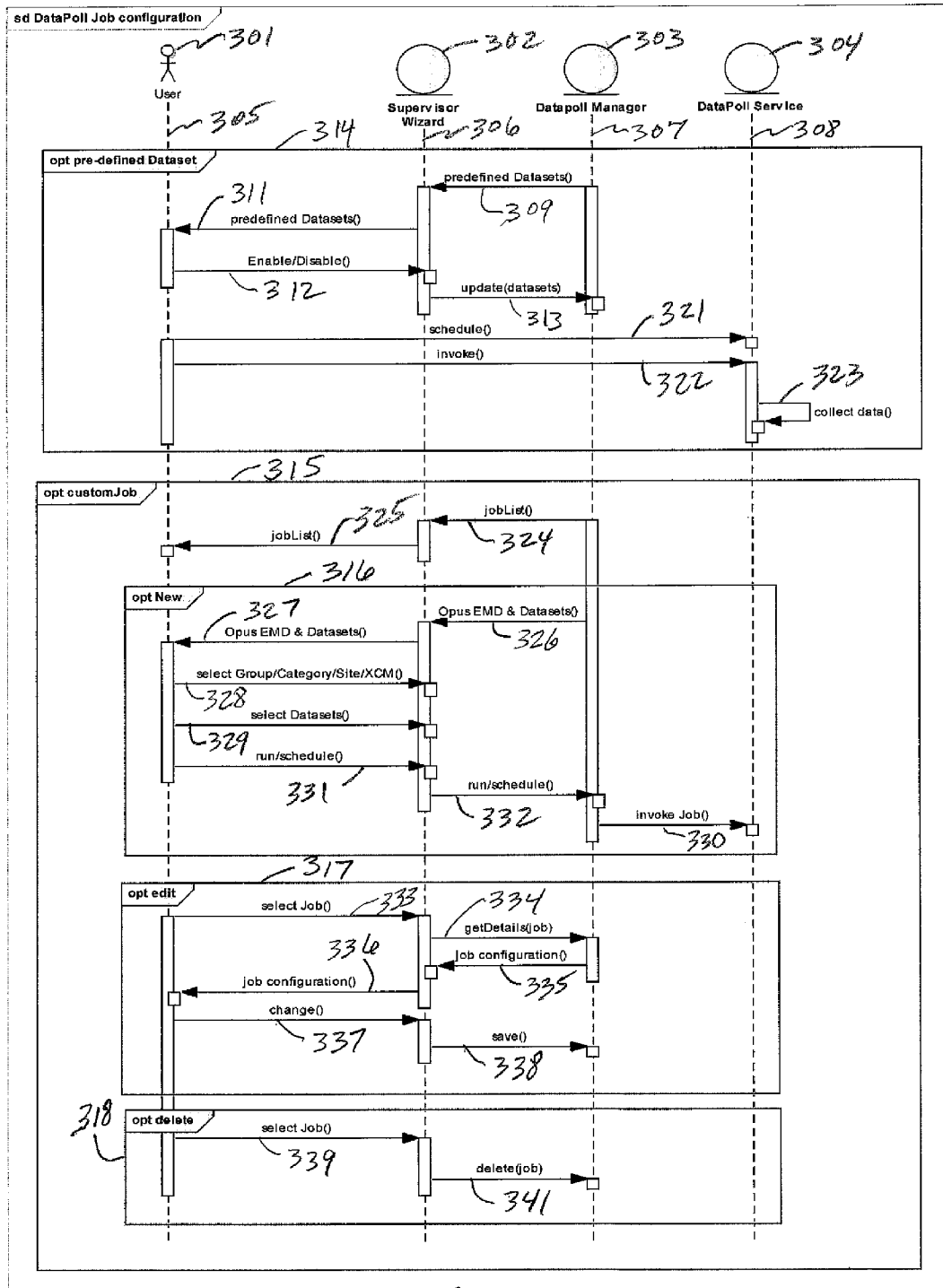
FIG. 12 is a diagram of a data poll job configuration.

FIG. 12 is a diagram of a data poll job configuration. It may include user 301, a supervisor wizard 302, data poll manager 303 and data poll service 304, having with places 305, 306, 307 and 308, respectively. Places 305, 306, 307 and 308 may be represented by vertical dashed lines in the diagram. In area 314, for a predefined dataset, predefined datasets may follow a line 309 from place 307 to the place 306. Predefined datasets may follow a line 311 from place 306 to place 305. An enable/disable may go from place 305 along a line 312 to place 306. An update (datasets) may go from place 306 along line 313 to place 307. A schedule may flow from place 305 to place 308 along line 321. An invoke may go from place 305 along line 322 to place 308. A collect data which is of line 323 may be situated at place 308. In a custom job at area 315, a job list may follow a line 324 from place 307 to place 306. The job list may go from place 306 along line 325 to place 305. Within the custom job area 315 may be a new area 316. Within this area an Opus EMD and datasets may go along line 326 from place 307 to place 306. The Opus EMD and datasets may go from place 306 along line 327 to place 305. A select group/category/site/XCM may go from place 305 to place 306 along a line 328. From place 305 along a line 329 to place 306, may be run/select datasets. A run/schedule on line 331 may go from place 305 to place 306 and on line 332 it may go from place 306 to place 307. An invoke job may go from place 307 to place 308 along line 330.

Within in edit area 317 of area custom job 315, may be a select job along line 333 from place 305 to place 306, and a get details (job) along line 334 from place 306 to place 307. A job configuration may go from place 307 along line 335 to place 306. The job configuration may go from place 306 along line 336 to place 305. A change may go from place 305 to place 306 along line 337. A save may go from place 306 to place 307 along line 338.

In a delete area 318 within the custom job area 315, a select job may go from place 305 along line 339 to place 306. A delete job may go from place 306 along line 341 to place 307.

Figure 13:
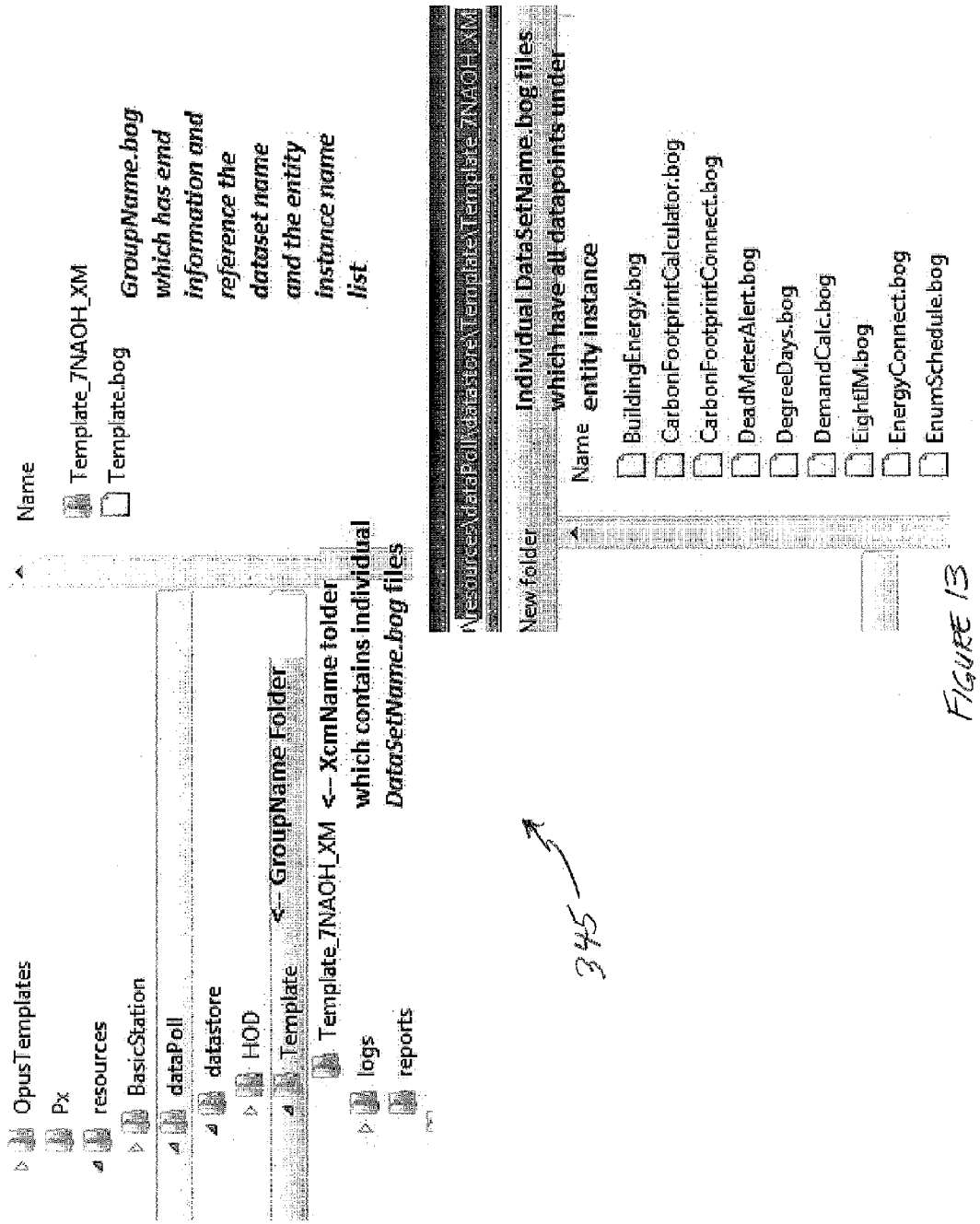
FIG. 13 is a diagram of a sample Data store file structure.

FIGS. 13 through 16 may be diagrams of examples of data structures. FIG. 13 is a diagram of a sample Data store file structure 345.

Figure 14:
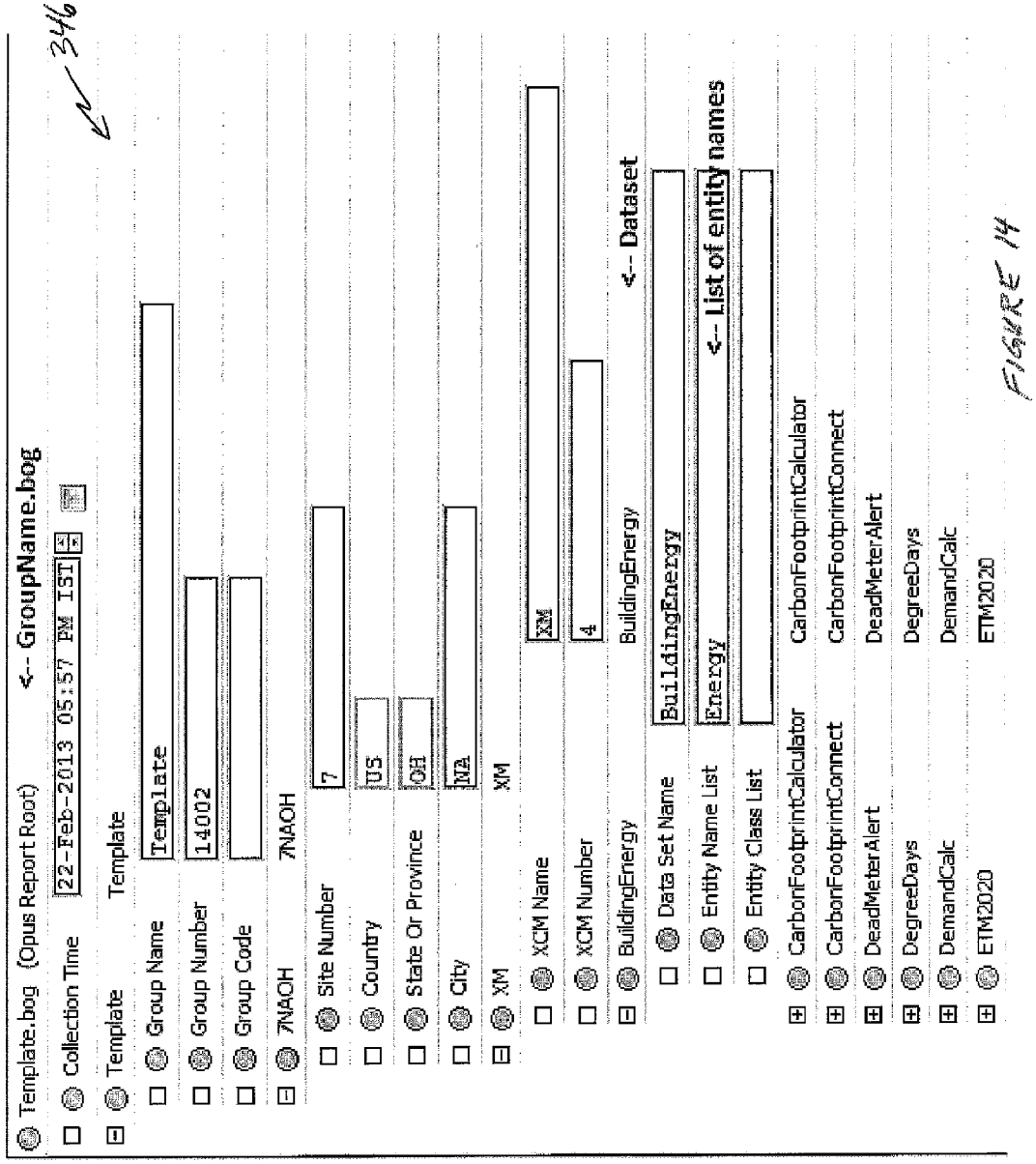
FIG. 14 is a diagram of a template bog for a report root of a group name bog.

Group name.bog may be found under a group name folder. It may contain EMD information related to the group along with a reference to the dataset and individual instances. The dataset instances may be named as a string-based entity name list. FIG. 14 is a diagram of a template- .bog for an Opus report root of a group name.bog 346. FIG. 15 is a diagram of an example Opus dataset component 347 for a demand calc (calculation) of a dataset name.bog. FIG. 16 is a diagram of an example collection job component structure 348.

The user may select one or more datasets to generate a report which displays the data in a tabular view. In case of exception reports, the user may select a profile, which will be compared with datasets to detect and report property values that do not match with the values specified in the selected profile. Unmatched values may be highlighted in the exception reports that will be generated. These reports may be generated instantly or can be scheduled. Generated reports may be exported to CSV or PDF content and the report files may be sent as e-mail to the configured recipients. The user may add, change and delete user-defined reports. The user also may have an option to view a list of current or past report execution histories of the reports.

Figure 17:
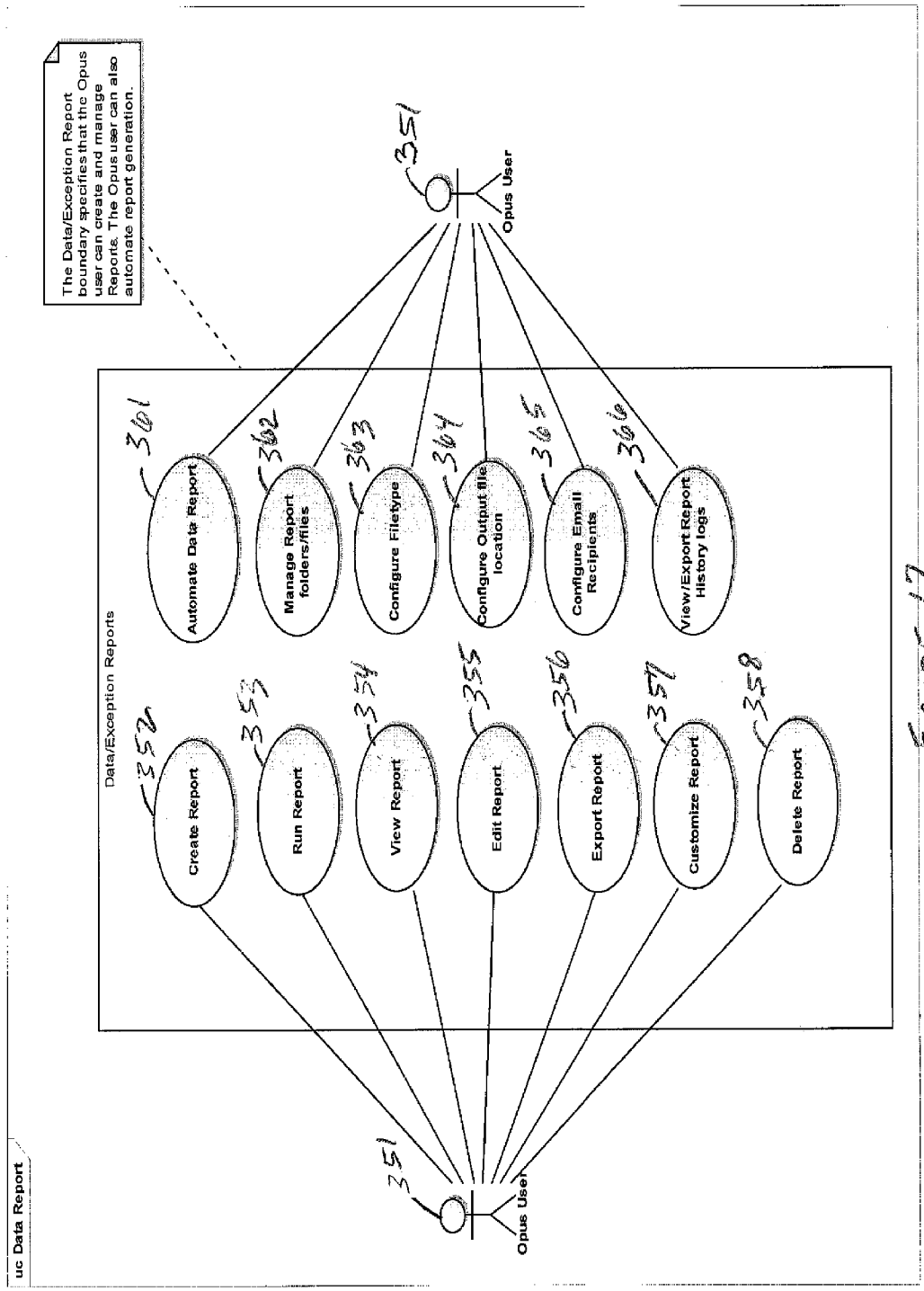
FIG. 17 is a diagram of a process for data exception reports.

FIG. 17 is a diagram of a process for data exception reports. The data/exception report boundary may specify that the Opus user can create and manage reports. The Opus user may also automate report generation. A user 351 may create a report at symbol 352, run a report at symbol 353, view the report at symbol 354, edit the report at symbol 355, export the report at symbol 356, customize the report at symbol 357 and delete the report at symbol 358. Also in the diagram of FIG. 17, user 351 may automate the data report at symbol 361, managed report folders/files at symbol 362, configure the file type at symbol 363, configure the output file location at symbol 364, configure e-mail recipients at symbol 365 and view/export report history logs at symbol 366.

A wizard may allow the user to create, edit, and delete user defined data/exception reports. The user may be allowed to generate reports instantly or they may be scheduled. Wizard may also provide the user an option to e-mail generated reports to configured recipients in case of automated reports. The wizard may allow one to view/export report execution history logs. The user may be able to configure the output file location and file type.

The report configuration may consist of filter selection to generate a report, EMD filter selections, column customization, and so forth. This may be stored as a BD data poll report component object under a station's global services report jobs. When a new report is being configured, a new instance of a B data polled report may be created and when the report is saved, the same may be persisted in the supervisor station bog in the above noted path. Whenever a filter change or column customization is done, the same may be saved back to the bog. Report screen may have wizard screen classes used to manage the report user interface. The report may be generated out of the bog generated by a collection job feature which probes the station for dataset values. The box may be read using a report bog manager. The reports may be generated using report helper classes, e.g., set point helper generates a table for set point reports. During the filter selection when the entity is selected, a B Opus data poll component list may be maintained which is read from the bog file. During the run, the helper classes may iterate this list to reach to a data poll property class for generating rows and columns. For data reports, the user may select group, site, XCM and a dataset for which the report has to be generated. The user may also be able to choose an output file type and location. Once the report is generated, the user may have an option to e-mail the generated report.

Figure 18:
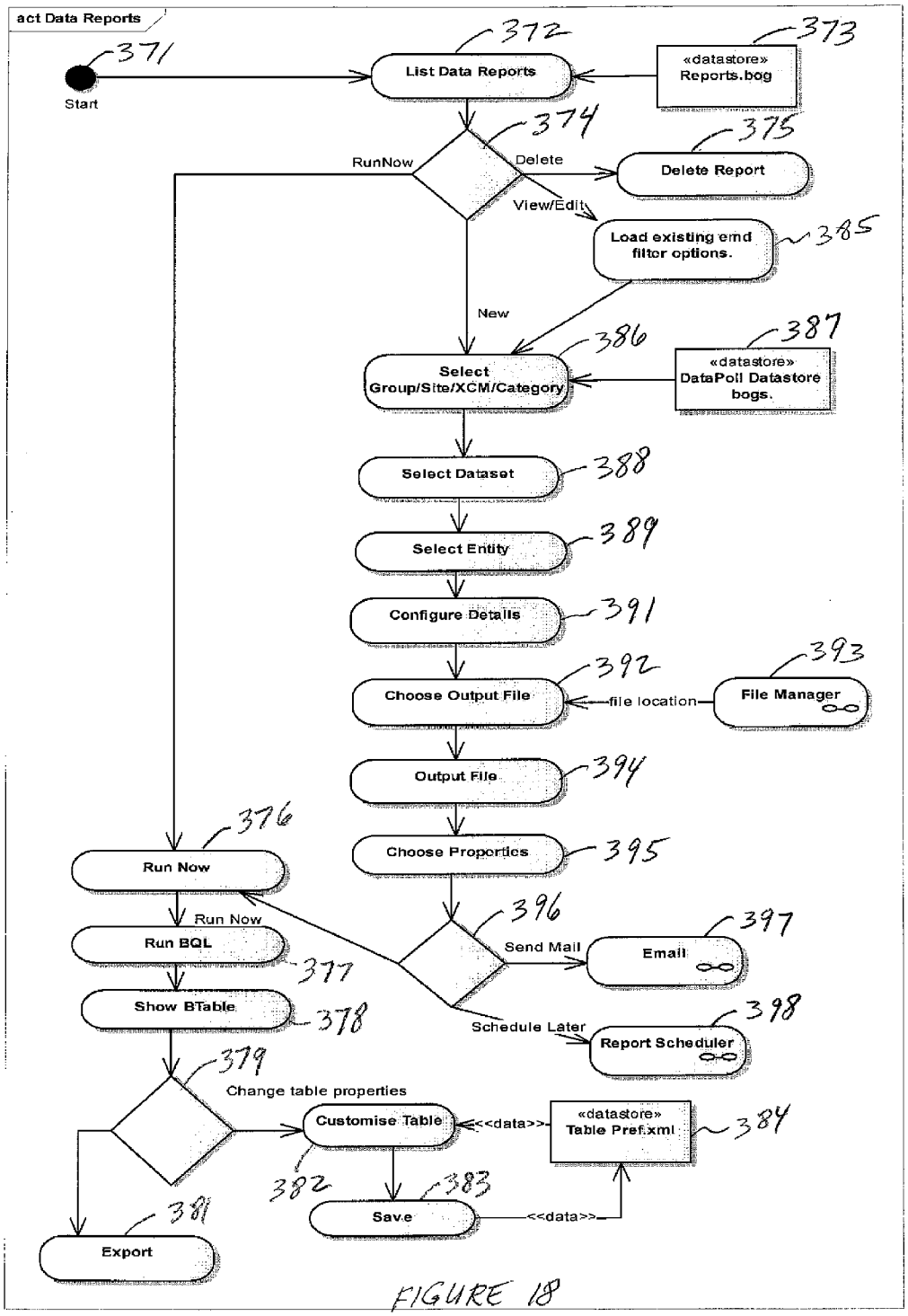
FIG. 18 is a diagram relating to data reports.

FIG. 18 is a diagram relating to data reports. One may start at symbol 371 and go to symbol 372 which may be a list of reports that may come from a reports.bog data store at symbol 373. Symbol 374 may follow symbol 372 with a decision to delete a report at symbol 375, view/edit at symbol 385 of load existing EMD and filter options and run now as indicated by symbol 376. A run BQL may follow symbol 376 at symbol 377. After symbol 377, symbol 378 may show a B table. Symbol 379 may follow symbol 378. Symbol 379 may involve a decision of going to export at symbol 381. The other decision from symbol 379 may be to change table properties, which is to customize a table at symbol 382. Data may come from a data store at a table pref.XML at symbol 384. After symbol 382, a table may be saved at symbol 383 and data of the save may go to the data store at symbol 384.

A return to symbol 374 may be made. Instead of doing a run now, one may with new to symbol 386 which is for a select group/site/XCM/category. Data may come from symbol 387 of a data store for data poll data store.bog. From symbol 386 one may go to symbol 388 for select dataset. The following symbol 389 may be select entity. Details may be configured at symbol 391. A choose output file at symbol 392 may follow. A file location may be received from a file manager at symbol 393. A file may be output at symbol 394 after being chosen in symbol 392. Properties may be chosen at symbol 395 following symbol 394. At symbol 396, a decision may be made as to where to go next. One choice may be going to symbol 376 run now and on to BQL at symbol 377. Show the table may be at symbol 378. The decision at symbol 379 may be go to symbol 381 and export, or go to change properties of the table at customize table of symbol 382. Data may be received at symbol 382 from data store of symbol 384 at table pref.XML. The customized table of symbol 382 may be saved at symbol 383. Data may go from symbol 383 to data store 384.

The symbol 396, after choosing properties at symbol 395, may send an e-mail to symbol 397 or a schedule may be made later at report scheduler of symbol 398.

Returning to symbol 374, a decision may be made to delete a report at symbol 375, or to view/edit at symbol 385 where the existing EMD filter options are loaded. After symbol 385, a select of group/site/X CM/category may be done at symbol 386. Data poll dot bog of data store at symbol 387 may be provided to symbol 386 where the group/site/axiom/category is selected. After symbol 386, select dataset may be performed. Select entity may follow at symbol 389, and details may be configured at symbol 391. An output file may be chosen at symbol 392, with information about a file location from file manager at symbol 393. Open file may be provided at symbol 394. Properties may be chosen at symbol 395. A decision as to whether to run now at symbol 376, send email to symbol 397 or to schedule later at report scheduler of symbol 398, may be made. A sequence after symbol 376 may be noted herein.

Exception data reports may be noted. A user may need to select group, site, XCM, dataset and a profile for which the data values will be compared with actual values and an exception report may be generated with highlighted values as needed. The user may also be able to choose an output file type and location. Once the report is generated, the user may have an option to email a generated report. A diagram for a flow of exception data reports may start at symbol 401. Data reports may be listed at symbol 402. Data reports information may be obtained from a data store at reports.bog in symbol 403 by symbol 402. A decision may be made at symbol 404, to delete report at symbol 405, view/edit at symbol 421 that loads existing EMD filter selections, go new to symbol 422 to select a group/site/XCM/category with information from a data store at symbol 423 of group name dot bog, or to run now at symbol 406.

From run now at symbol 406 to symbol 407 which indicates a run BBQ may occur. Symbol 408, after symbol 407, may show a B table. At symbol 411, after symbol 408, may be a compare table values with profile value. After symbol 411, cells may be highlighted if there is a mismatch as indicated at symbol 412 with information to a decision at symbol 409. After symbol 412, the decision may be made at symbol 409 to change table properties or use an export option. Change table properties table go to customize table at symbol 415 along with data from data store at symbol 416 with table pref.XML. The customized table may be saved at symbol 417 and with information to data store at symbol 417. Another decision at symbol 409 may be to choose rows which have highlighted values for exporting. After symbol 413, an export may be effected at symbol 414. From symbol 409 with symbol 413 being skipped, one may go straight to export symbol 414 for export to PDF/CSV.

Figure 19:
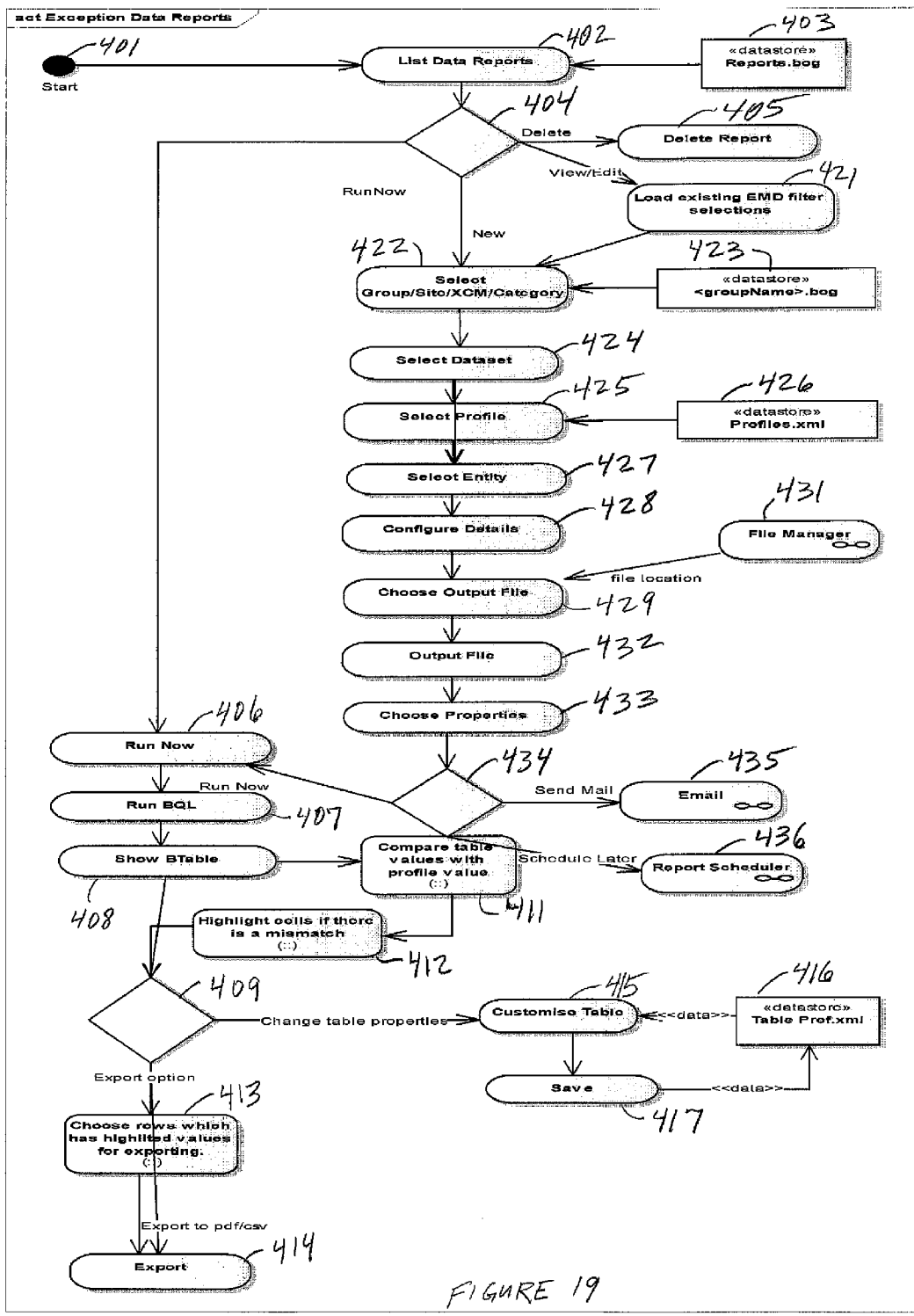
FIG. 19 is a diagram relating to exception data reports.

From symbol 422, as noted herein, one may select dataset at symbol 424 and then select profile at symbol 425. One may instead or go directly to select entity at symbol 427. At symbol 425 for select profile, information from data store at symbol 426 with profiles.XML, may be provided to symbol 425. From either symbol 424 or symbol 425, a select entity at symbol 427 may occur. After symbol 427, details may be configured at symbol 428 and a file location may be received from a file manager at symbol 431 for choosing an output file at symbol 429. A file may be outputted at symbol 432 after a file is chosen at symbol 429. Properties may be chosen afterwards at symbol 433. After symbol 433, a decision may be made to send mail to symbol 435 for e-mail, to schedule later at report scheduler at symbol 436, or to run now at symbol 406. Activities after symbol 406 may be noted herein relative to FIG. 19.

A report scheduler may be noted. A user may have to choose data and time for scheduling a report generation. A report may be generated at a user chosen date and time. The user may have to specify an output file location and type to save the generated report. A generated report file may be e-mailed to the configured users, if the user chooses an e-mail option.

Figure 20:
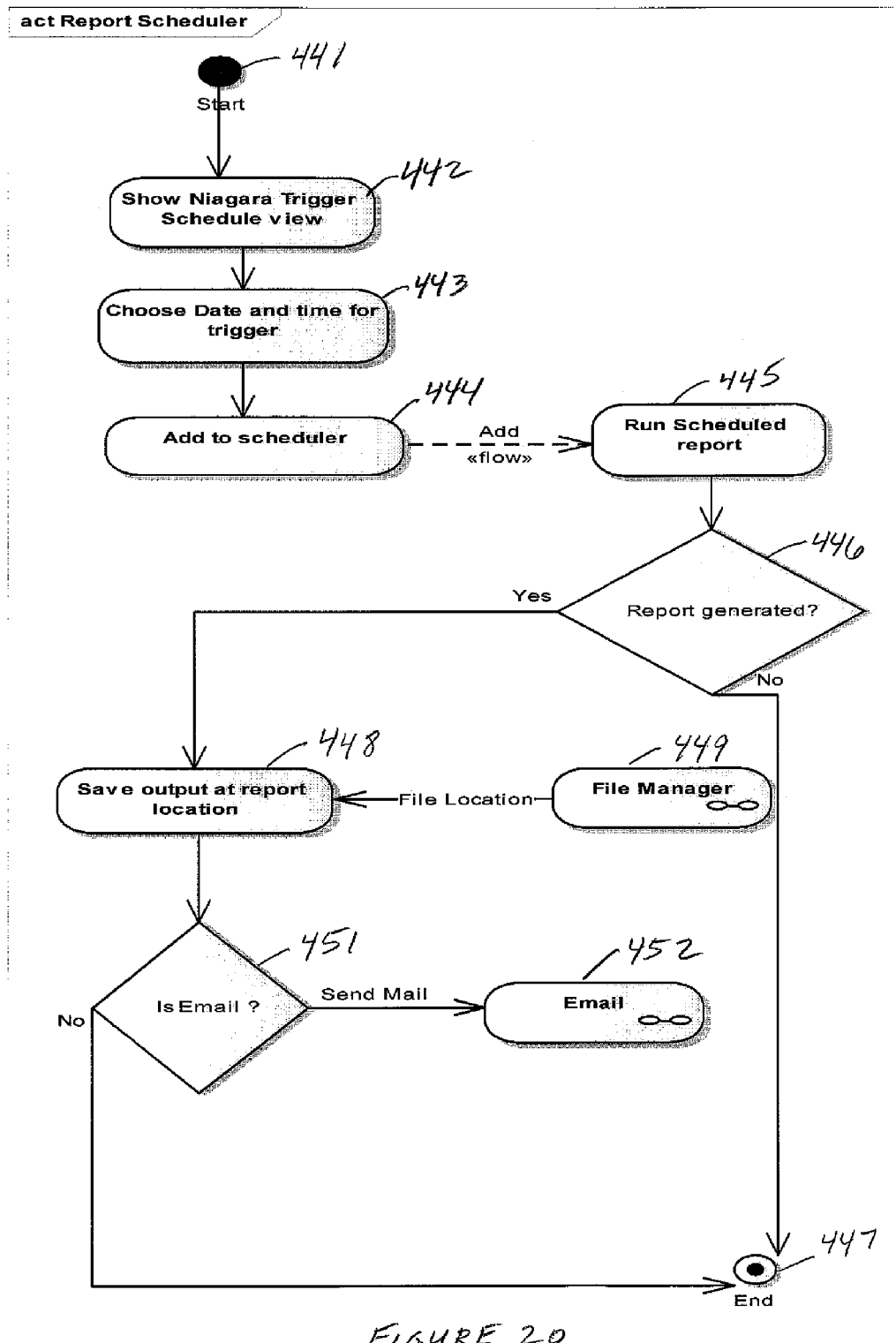
FIG. 20 is a diagram of a report scheduler.

FIG. 20 is a diagram of a report scheduler which may start at symbol 441. Following a start, a Niagara trigger schedule video may be shown at symbol 442. Then a date and time for trigger may be chosen at symbol 443. Information may be added to a scheduler at symbol 444. Information may flow to symbol 445 which is for running a scheduled report. A question following symbol 445 is whether a report was generated as indicated at symbol 446. If an answer is no, then the flow may end at symbol 447. If a report is to be generated, then an output at report location may be saved as indicated in symbol 448. File location information may come from a file manager at symbol 449. A question that may be asked at symbol 451 after symbol 448, is whether the output save at the report location is to be e-mailed or not. If the answer is yes, then mail may be sent via e-mail at symbol 452. If the answer is no, then the flow may end at symbol 447.

As to e-mail data reports, a user may need to select e-mail recipients, an attachment type, e-mail subject, and a message to be sent along with the e-mail. The e-mail may be sent via a Niagara mail service.

Figure 21:
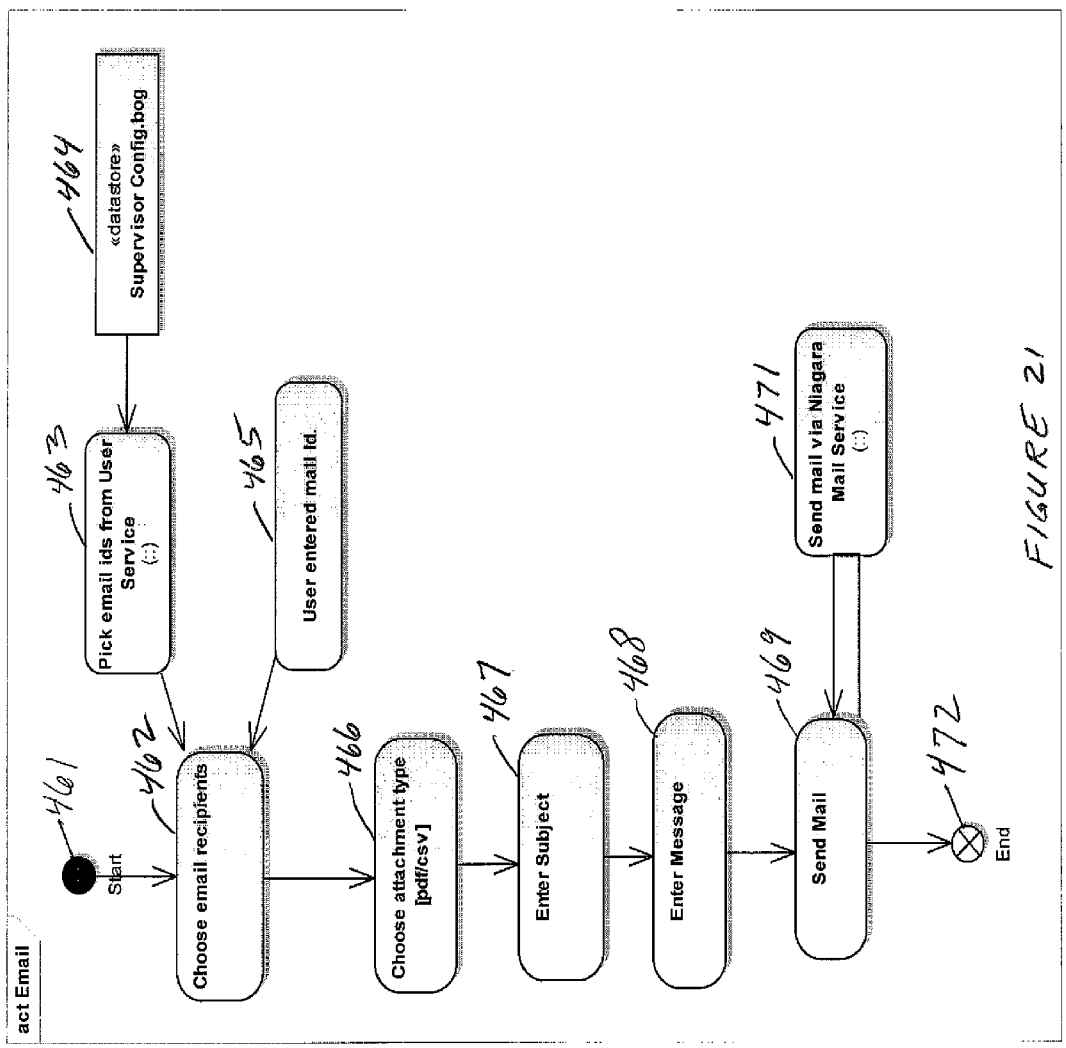
FIG. 21 is a diagram of an e-mail process.

FIG. 21 is a diagram of an e-mail process. It may start at symbol 461. E-mail recipients may be chosen at symbol 462. An e-mail IDS may be picked from a user service at symbol 463. Information from data store at symbol 464 with supervisor config.bog may be provided to symbol 463 and, in turn, information from symbol 463 may go to symbol 462 for choosing e-mail recipients. A user entered e-mail ID at symbol 465 may be provided to symbol 462 for choosing e-mail recipients. An attachment type may be chosen at symbol 466, such as PDF/CSV. A subject may be entered at symbol 467 and a message may be entered at symbol 468. Symbol 469 may be a send mail step. Symbol 471 may indicate mail sent via Niagara mail service. The flow may end at symbol 472.

A file manager may be noted. A user may manage report data files using the file manager. The user may view a list of all report data files, open and you a report data file with an associated file viewer, copy/paste report data files to another location, and/or move files to other locations.

Figure 22:
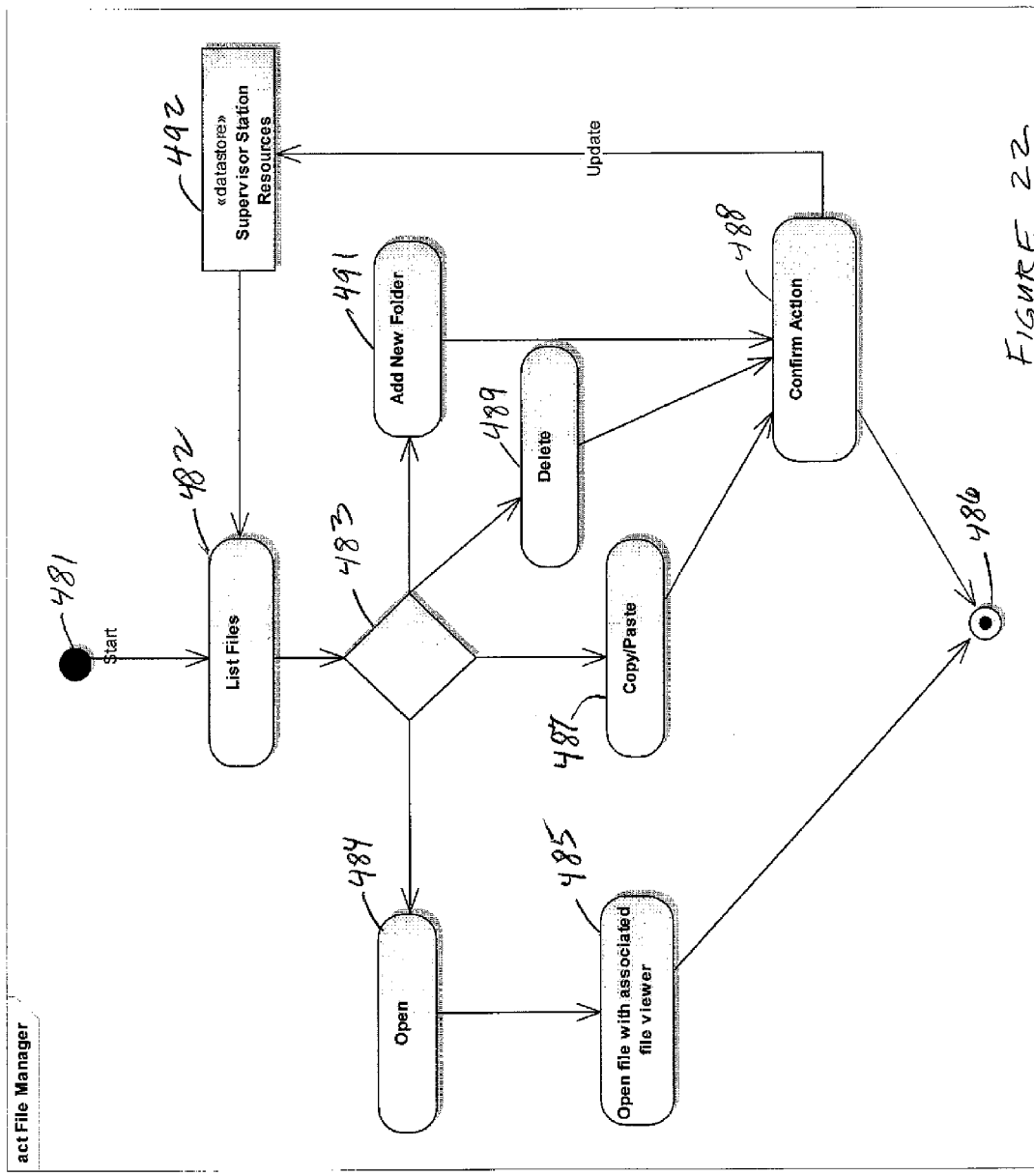
FIG. 22 is a diagram of file manager activity.

FIG. 22 is a diagram of file manager activity which may start at symbol 481. Files may be listed at symbol 482. Information may come from a data store at symbol 492 which has supervisor station resources. After symbol 482, a decision may be made at symbol 483 which may incorporate to open a file at symbol 484 which may be opened with an associated file viewer as indicated by symbol 485. After symbol 485, the activity may end at symbol 486. Back to a decision of symbol 443, a file may be copied/pasted at symbol 487 which may be confirmed as an action at symbol 488, and end at symbol 486. From symbol 483, a file may be deleted at symbol 487 which may be a confirmed action at symbol 488 and end at symbol 486. Also from symbol 483, a new folder may be added at symbol 491 and confirmed at symbol 488 and end at symbol 486. In the instances of confirm action, the data store at symbol 492 may be updated with the information from symbol 488.

Figure 23:
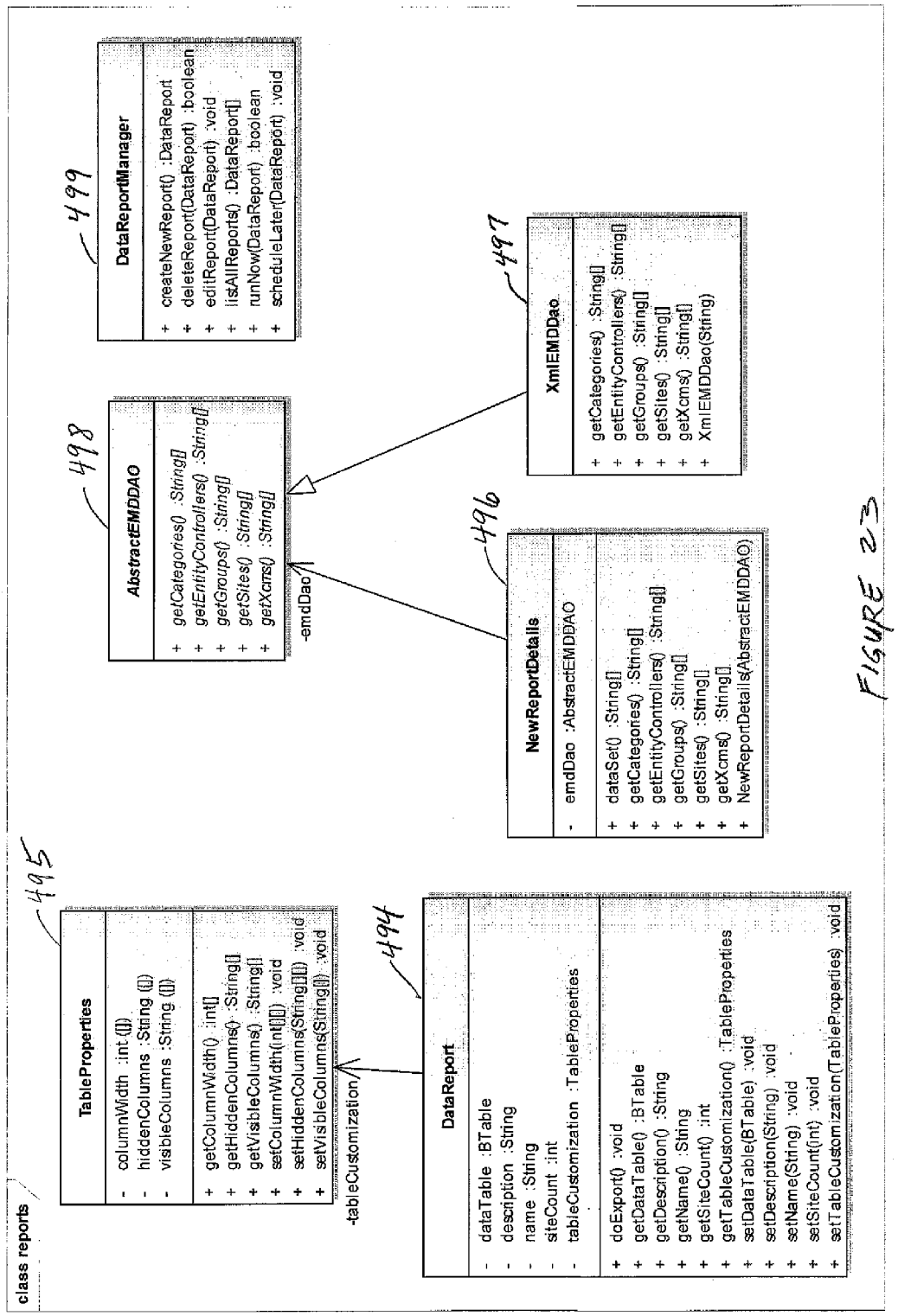
FIG. 23 is a diagram of class reports.

Interfaces may be noted. FIG. 23 is a diagram of class reports. A data report indicating information in symbol 494 may go to table properties in symbol 495. Symbol 496 may incorporate new report details which go to symbol 498 relating to an abstract of EMD and DAO. Information pertaining to XML, EMD and DAO at symbol 497 may go to symbol 498. Symbol 499 may contain information about a data report manager.

Data structures may be noted. FIG. 24 may be an example of a data structure and content of a B data poll report component which stores a report configuration.

Opus versioning may be noted. A user may invoke a collection job on virtually all of the XCM's which will return a detailed list of the XCM's. This may provide information on the Opus version, template version and the Niagara version of the respective XCM's. Subsequently, the user may create a new upgrade job and after selecting any number of XCM's, do a full commissioning, upgrade out of date software, or do an XCM upgrade configuration on the selected XCM's. A corresponding job may be saved. The user may add, change or delete upgrade jobs. The user may also have an option of viewing a history log of any of the previously saved upgraded jobs.

Figure 25:
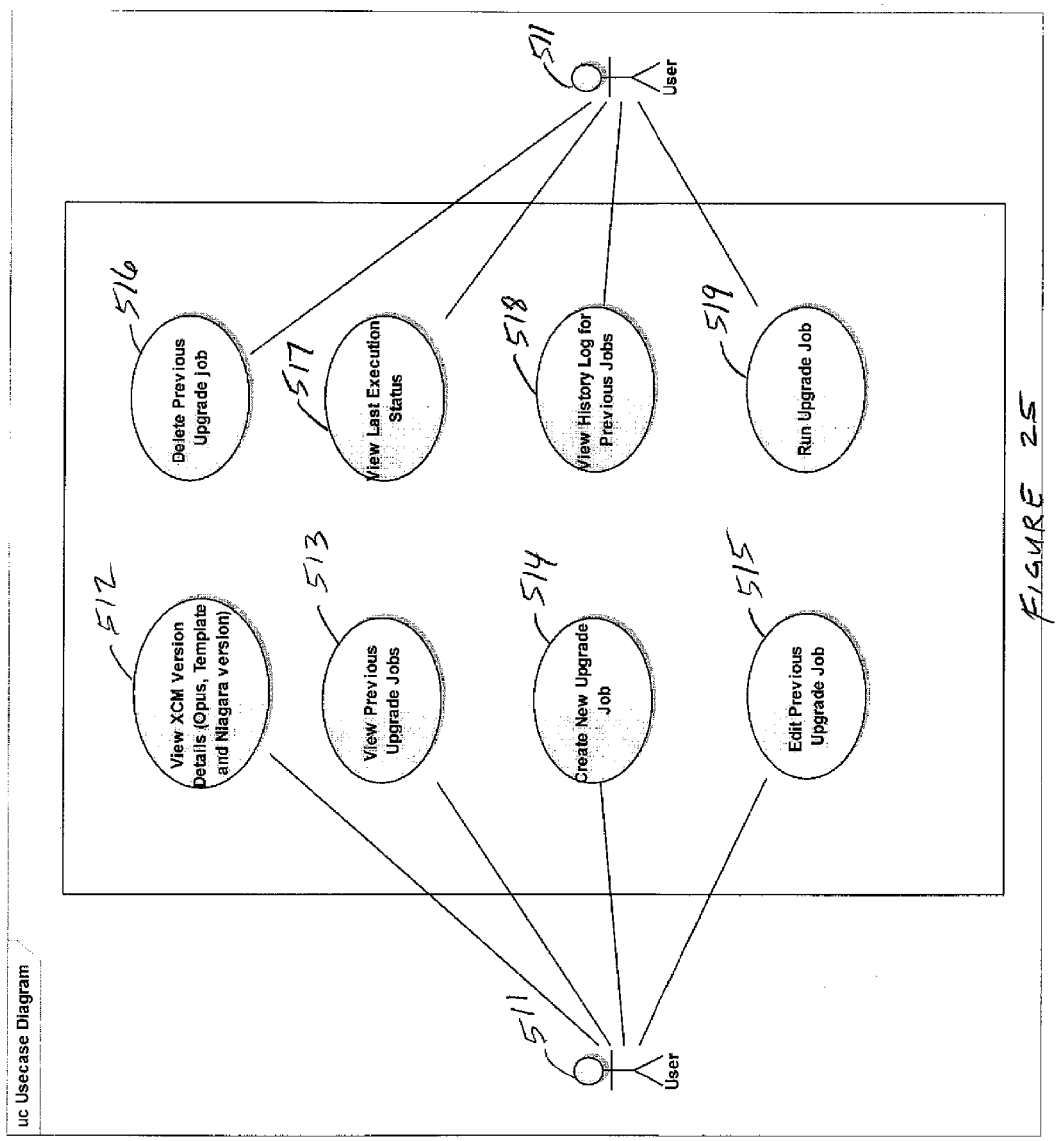
FIG. 25 is a diagram of a use case.

FIG. 25 is a diagram of a use case. User 511 may view XCM version details (Opus, template and Niagara versions) at symbol 512. Previous upgrade jobs may be viewed by user 511 at symbol 513. A new upgrade job may be created at symbol 514. User 511 may edit previous upgrade job at symbol 515. User 511 may delete a previous upgrade job at symbol 516. A last execution status may be viewed at symbol 517. A history log for previous jobs may be viewed at symbol 518. User 511 may run an upgrade job at symbol 519.

Opus versioning may allow a user to view detailed information of virtually all the XCM's, namely the Opus version, the template version and the Niagara version. It may allow the user to upgrade virtually any number of XCM's, for example, with three options. The options may incorporate full commissioning, an upgrade of out of date software, and an upgrade of an XCM configuration. The user may be able to see the history log of a currently executing job. Once the job is completed, the user may the user may view history logs of virtually all the previously executed jobs. The user may have an option to add, view, edit and delete any of the previous jobs.

Detailed information of all of the XCM's, namely the Opus version, the template version and the Niagara version, may be stored in Opus version.bog file, which can be saved under resources—an Opus versions folder of a supervisor station. Whenever the user invokes a collection job, the bog file may be updated.

A configuration screen of Opus versioning may consist of a user selecting a group, site and XCM's. After this, the user may have to select from one of the options that incorporate full commissioning, an upgrade of out of date software and an upgrade of XCM configuration. The configuration may be saved as a B Opus version upgrade job component under a station's global services version upgrade jobs. The logs which are generated at the time of executing an upgrade job may be stored as an XML file under resources—Opus versions—logs folder of the supervisor station.

Processing may be noted. A user may view an XCM version detail screen, which can provide details of the XCM's. After that, the user may either create a new upgrade job or view/edit a previous job, and after configuring the group, site and XCM's, run a particular job with any of the three functions which incorporate 1) full commissioning, 2) an upgrade of out of date software, and 3) an upgrade of an XCM configuration.

Figure 26:
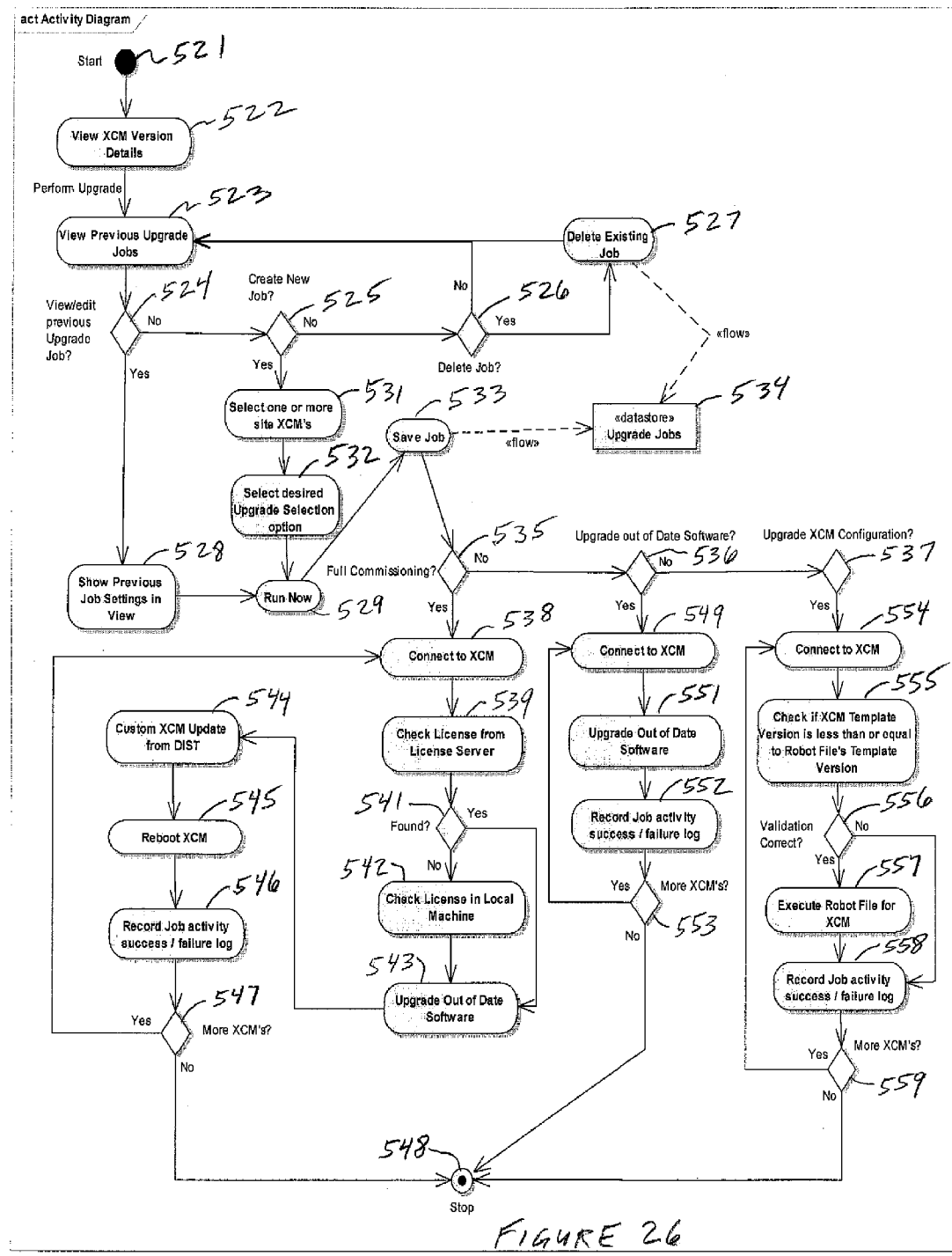
FIG. 26 is a diagram of example activity of an open multisite version management system.

FIG. 26 is a diagram of an activity. The activity may start at symbol 521. At symbol 522, an XCM version with details may be viewed. An upgrade may be performed on a way to symbol 523, where previous upgrade jobs are reviewed. After symbol 523, the question may be asked at symbol 524 whether the previous upgrade job was viewed or edited. If an answer is no, then a question may be asked at symbol 525 whether a new job was created. If an answer is no, then a question at symbol 526 may be asked as to whether a job was deleted or not. If an answer is no, then one may return to symbol 523 where the previous upgrade jobs are viewed. The question may be asked again as to whether the previous upgrade job was viewed or edited at symbol 524. If the answer is yes, then one may go to symbol 528 where the previous job settings are shown in a view. Subsequently, a symbol 529 may indicate that a program is to be run now. A job may be saved at symbol 533 where data flows from symbol 533 to symbol 534 which is a data store which includes information on upgrade jobs. The data store at symbol 534 may receive information from symbol 527 wherein an existing job may be deleted.

After symbol, 533 at symbol 535, a question whether there is a full commissioning may be asked. If an answer is no, then at symbol 536 a question of whether out of date software is to be upgraded. If an answer is no, then at symbol 537, a question whether the XCM configuration is to be upgraded may be asked. If an answer is yes, then a connection may be made to an XCM at symbol 554. After symbol 554, there may be symbol 555 were a check of whether an XCM template version is less than or equal to a robot file's template version. Then symbol 556 may have a question as to whether a validation is correct. If an answer is no, then at symbol 558 a job activity success/failure log may be recorded. If an answer for symbol 556 is yes, then a robot file for an XCM may be executed at symbol 557. Then a job activity success/failure log may be recorded at symbol 558. Symbol 559 may have a question as to whether there are more XCM's. If the answer is yes, then the return is made to symbol 554 to connect to XCM. And then the sequence of symbols 555, 556, 557 and 558 may be repeated. If the answer to symbol 559 is no, then a stop may occur at 548.

If an answer at symbol 536, is yes with respect to an upgrade of out of date software, then a connect to an XCM may occur at symbol 549. Then out of date software may be upgraded at symbol 551. At symbol 552, a job activity success/failure log may be recorded. Then at symbol 553, a question may be asked as to whether there are more XCM's. If the answer is yes, then a return may be made to symbol 549 to connect to an XCM. The process may be repeated at symbols 551, 552 and 553 with the question of more XCM's. If the answer is no to the question at symbol 553, then a stop may occur at symbol 548.

In returning to symbol 535, if the answer is yes to a full commissioning, then one may go to symbol 538 to connect to an XCM. Then a license from the license server may be checked for at symbol 539. A question at symbol 541 may ask whether a license was found or not. If an answer to the question is yes, then the flow may go to symbol 543 where an upgrade of out of date software occurs. If the answer is no symbol 541, then a flow goes to symbol 542 where a check for license is made in a local machine. Then the out of date software may be upgraded at symbol 543. The flow may go to symbol 544 where there may be a custom XCM update from DIST. At symbol 545, the XCM may be rebooted. A job activity success/failure log may be recorded at symbol 546. At symbol 547 a question may be asked as to whether there are more XCM's. If the answer is yes, then a return to symbol 538 may occur and the process may continue through symbols 539, 541, 542, 543, 544, 545, 546 and 547, as shown herein. If an answer at symbol 547 to the question of more XCM's is no, then the flow may stop at symbol 548.

Interfaces may be noted. There may be a relationship between different jobs created for each of the functions such as full commissioning, upgrade out-of-date software, and upgrade of an XCM configuration.

Figure 27:
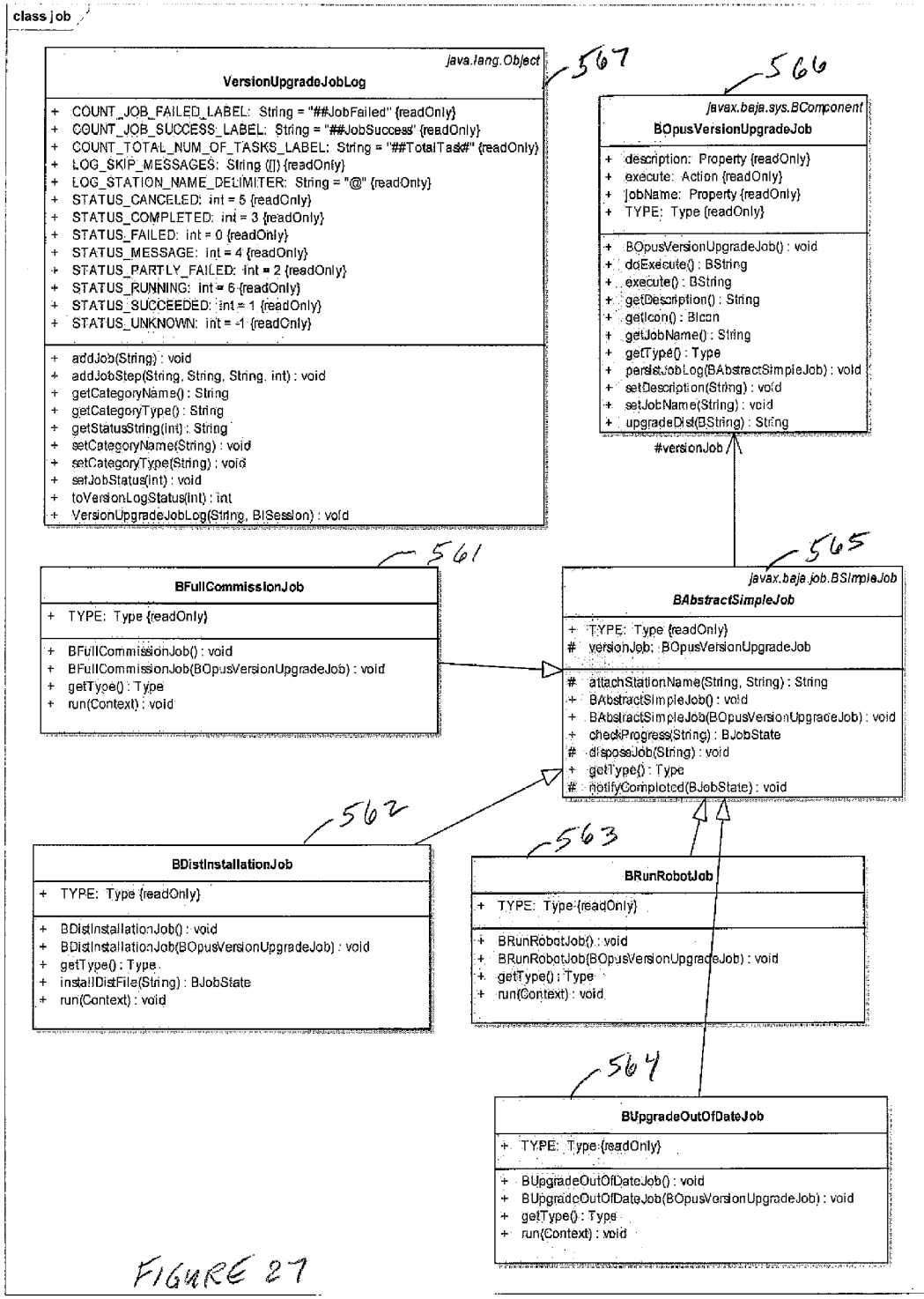
FIG. 27 is a diagram of information relevant to jobs.

FIG. 27 is a diagram of information relative to jobs. Symbol 561 illustrates information for a B full commission job with an output to a B abstract simple job symbol 565. Symbol 562 may be of a B dist installation job containing information provided to symbol 565. Symbol 563 may have information pertaining to a B run robot job provided to diagram 565. Symbol 564 may have information pertaining to a B upgrade of an out of date job provided to symbol 565. Information from symbol 565 of a B abstract simple job and information received job symbols 561-564 may be provided to symbol 566 for a B Opus version upgrade job. Symbol 567 may have a log for version upgrade job activity.

Figure 28:
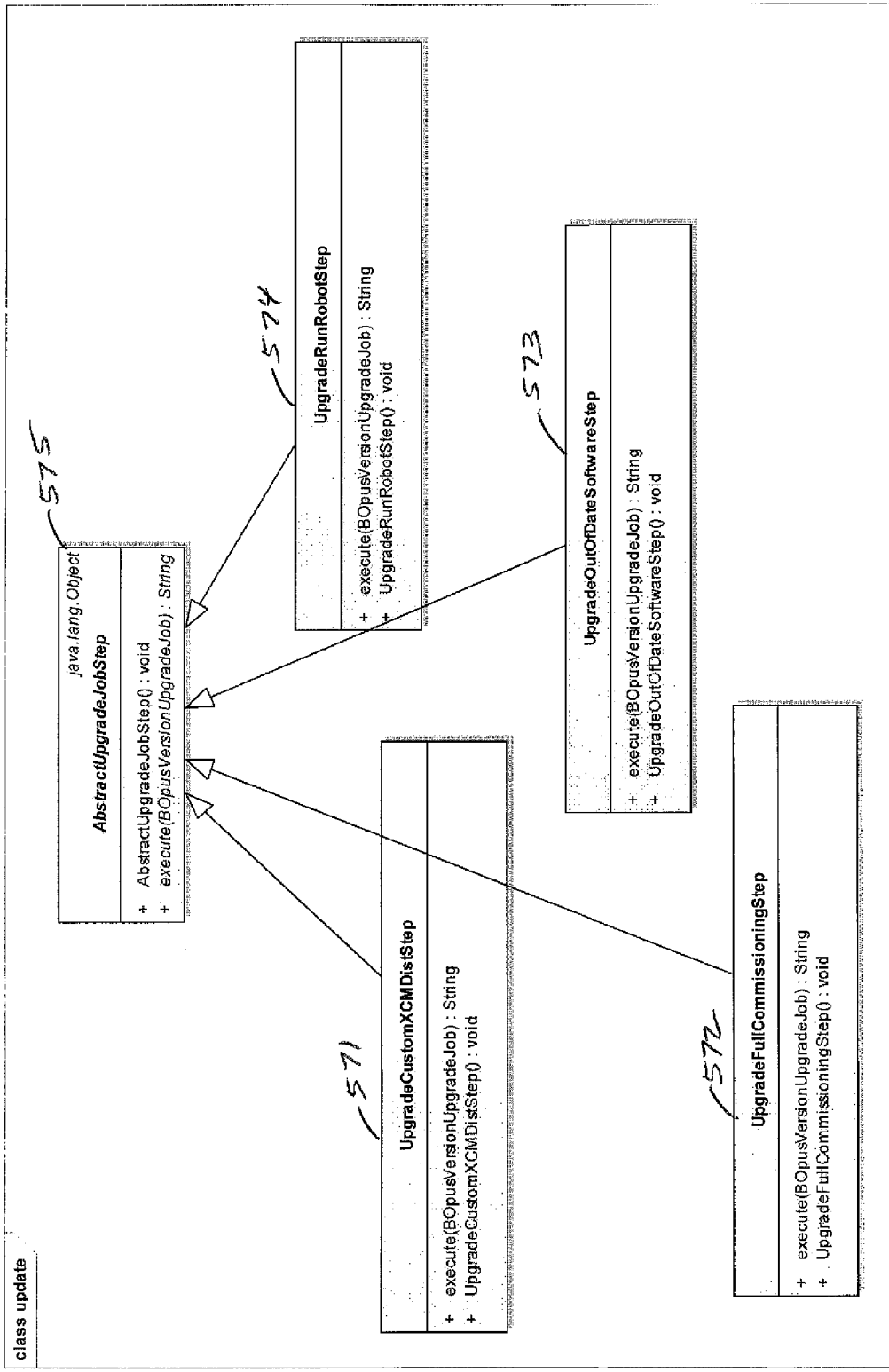
FIG. 28 is a diagram illustrative of a relationship between different steps pertaining to full commissioning, an upgrade of out-of-date software and an upgrade of a site controller configuration.

FIG. 28 is a diagram illustrative of a relationship between different steps for functions pertaining to full commissioning, an upgrade of out of date software and an upgrade of an XCM configuration. Symbol 571 may have information pertaining to an upgrade custom XCM DIST step which may go to symbol 575 pertaining to an abstract upgrade job step. Symbol 572 may have information on an upgrade full commissioning step which may go symbol 575. Information on an upgrade of an out of date software step in symbol 573 may go to symbol 575. Upgrade run robot step information of symbol 574 may go to symbol 575 pertaining to the abstract upgrade job step.

Figure 29:
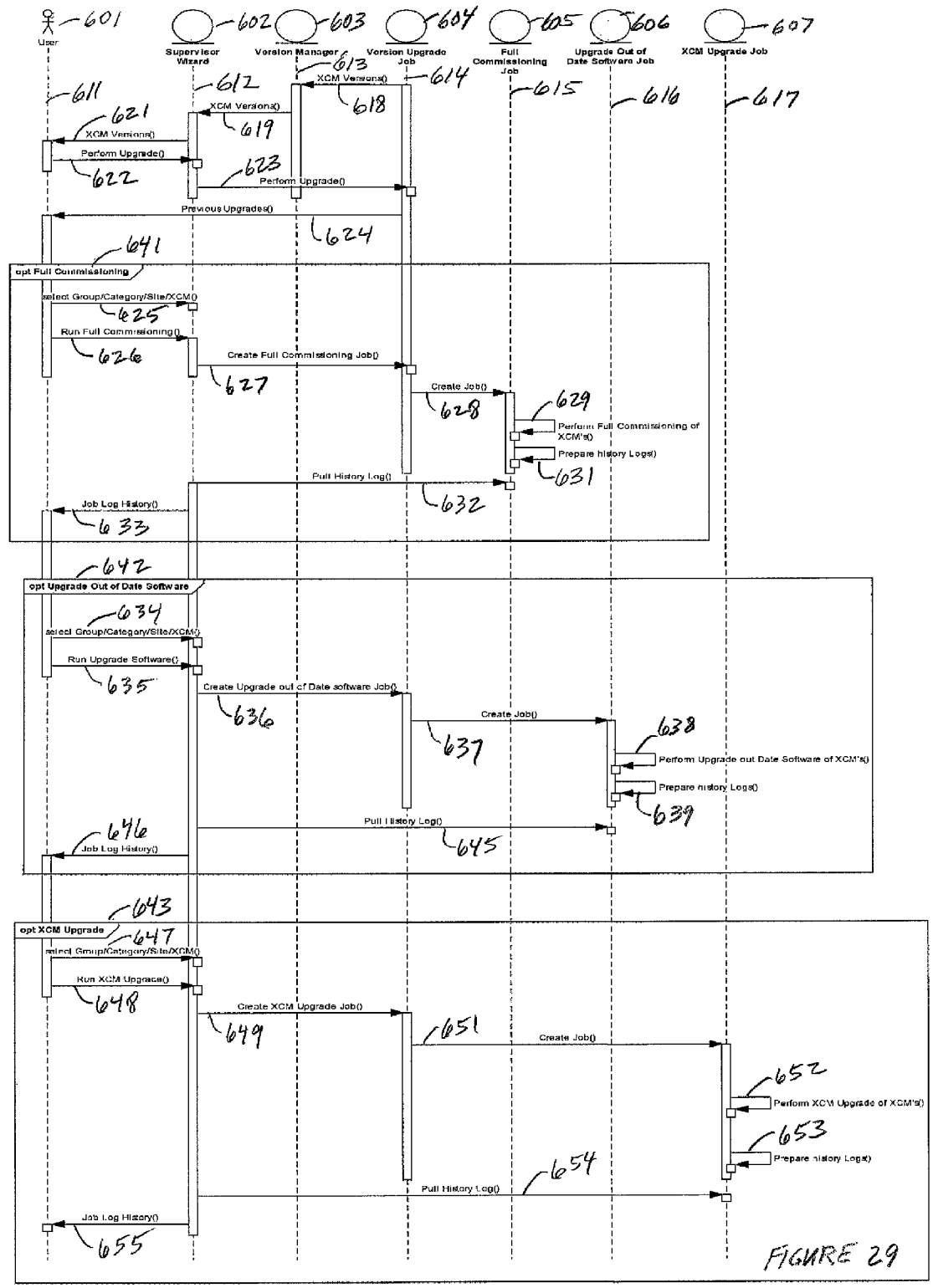
FIG. 29 is a diagram of a sequence of activity relative to supervisor wizard, version manager, version upgrade job, a fill commissioning job, an upgrade of out-of-date software, and a site controller update job.

FIG. 29 is a diagram of a sequence of activity. There may be a user 601 having a place 611. A supervisor wizard may have a place 612, a version manager 603 may have a place 613, a version upgrade job 604 may have a place 614, a full commissioning job 605 may have a place 615, an upgrade out of date software job 606 may have a place 616, and an XCM upgrade job 607 may have a place 617. Places 611, 612, 613, 614, 615, 616 and 617 may be represented by dashed lines. XCM versions 618 may go from place 614 to place 613. XCM versions 619 may go from place 613 to place 612. XCM versions may go from place 612 to place 611. A perform upgrade 622 may go from place 611 to place 612. Perform upgrade 623 may go from place 612 to place 614. Previous upgrades 624 may go from place 614 to place 611.

An area 641 may cover full commissioning. A select/category/site/XCM 625 may go from place 611 to place 612. A run full commissioning 626 may go from place 611 to place 612. A create full commissioning job 627 may go from place 612 to place 614. A create job 628 may go from place 614 to place 615. A perform full commissioning of XCM's 629 occur at place 615. Prepare history logs 631 may occur at place 615. A pull history log 632 may go from place 612 to place 615. A job log history 633 may go from place 612 to place 611

An area 642 may pertain to an upgrade of out of date software. A select group/category/site/XCM 634 may go from place 611 to place 612. A run upgrade software 635 may go from place 611 to place 612. A create an upgrade of out of date software job 636 may go from place 612 to place 614. A create job 637 may go from place 614 to place 616. A perform an upgrade of out date software of XCM's 638 may occur at place 616. Prepare history logs 639 may occur at place 616. A pull history log 645 may go from place 612 to place 616. A job log history 646 may go from place 612 to place 611.

An area 643 may pertain to an XCM upgrade. A select group/category/site/XCM 647 may go from place 611 to place 612. A run XCM upgrade 648 may go from place 611 to place 612. A create XCM upgrade job 649 may go from place 612 to place 614. A create job 651 may go from place 614 to place 617. A perform XCM upgrade of XCM's 652 may occur at place 617. A prepare history logs 653 may occur at place 617. A pull history log 654 may go from place 612 to place 617. A job log history 655 may go from place 612 to place 611.

Data structures may be noted. Content of a B Opus version upgrade job component, which stores an Opus versioning configuration, may be covered at least in part by a data structure 661 shown in a diagram of FIG. 30.

To recap, a version control mechanism may incorporate one or more site controllers, a supervisor having a screen that provides an overview of version, configuration and software upgrade information about the one or more site controllers, and a database having updated versions, configurations and software upgrades for the one or more controllers.

The one or more site controllers may be assigned to site groups and categories. The one or more site controllers may be selected according to site group or category for updated versions, configurations, or software upgrades. The updated versions, configurations or software upgrades may be implemented in the one more site controllers that need updated versions, configurations, or software upgrades, according to the overview of version, configuration, or software upgrade information provided by the screen. The updated versions, configurations or software upgrades may be implemented in the one or more site controllers together selected as a group or category according to the overview.

The versions, configurations or software upgrades may be implemented by an execution of a job. The execution of the job may sequentially connect the supervisor to each site controller of the group or category to implement the versions, configurations or software upgrades for each site controller.

Versions, configurations or software updates of the one or more site controllers may be executed by the job with robots that are executed within each site controller according to the group or category of the one or more site controllers.

An approach for multi-site version management may incorporate providing one or more field controllers, providing one or more site controllers that manage the one or more field controllers, providing a supervisor that manages the one or more site controllers, upgrading, as needed or desired, the supervisor and the one or more site controllers, and providing a top level screen that can display an overview of virtually all version information for the one or more site controllers.

The upgrading may incorporate one or more items. The one or more items may be selected from a group consisting of commissioning a version for a site controller, an upgrade of a software module for a site controller, and an upgrade of a configuration of a site controller. The overview may enable a determination of which site controller or controllers need a commissioning of a version, an upgrading of software, and an upgrade of a configuration without connecting individually to each of the one or more site controllers to obtain the determination.

The approach may further incorporate selecting one or more site controllers for which a commissioning is a job that is executed for the one or more site controllers.

The job, upon being executed, may sequentially connect to each site controller of the one or more site controllers to the supervisor to detect a type of each site controller and to commission each site controller, respectively, to a version for each site controller. The job, as executed, may display on the screen operational steps, statuses and fault conditions. If a fault condition appears, the job may be executed again to remove the fault condition.

The approach may further incorporate selecting one or more site controllers for which an upgrade of software is a job that is executed for the one or more site controllers. The job, upon being executed, may sequentially connect to each site controller of the one or more site controllers to the supervisor to detect a type of each site controller and to provide the upgrade of software for each site controller.

The approach may further incorporate selecting one or more site controllers for which an upgrade of a configuration is a job that is executed for the one or more site controllers. The job, upon being executed, may sequentially connect to each site controller of the one or more site controllers to the supervisor to detect a type of each site controller and to provide the upgrade of the configuration for each site controller.

A multisite version management system may incorporate a supervisor, one or more remote site controllers managed by the supervisor, and one or more field controllers managed by a remote site controller. The one or more site controllers may be selected according to a group or category for a commissioning to another version, an upgrade of out-of-date software or an upgrade of a configuration for a site controller.

The system may further incorporate an overview screen. The overview screen may provide virtually all information pertaining to versions and upgrades of the one or more site controllers. The information may indicate which site controllers need another version or an upgrade.

The one or more field controllers may control one or more items selected from a group consisting of HVAC units, lighting panels, metering devices, refrigeration circuits, entry controls, security units, fire alarms, electric supplies, and water systems.

The full commissioning may incorporate a connection sequentially to each site controller, detection of a type of the site controller, and a full commissioning of the site controller to a new version.

The upgrade of out-of-date software may be provided from the supervisor sequentially to each site controller that has out-of-date software.

The upgrade of a configuration for a site controller may incorporate a connection sequentially to each site controller and execution of a user-selected robot or robots within each site controller. A robot may be a pre-installed configuration upgrade for a site controller.

A user may select an option to upgrade the site controllers to be upgraded. An upgrade operation type may be selected from a group consisting of full commissioning, upgrade of out-of-date software, and upgrade of a site controller configuration.

A full commissioning may incorporate the supervisor connecting to a site controller to retrieve a host identification, the supervisor checking a central license server to retrieve a license file for the site controller according to the host identification, and if the supervisor retrieves the license file, then the license file may be installed in the site controller.

A full commissioning may incorporate the supervisor connected to the site controller to retrieve a host identification. The supervisor may check a pre-defined license folder within a supervisor file system structure to retrieve a license file according to the host identification. If the supervisor retrieves the license file, then the license file may be installed in the site controller.

For a full commissioning, a license file for a site controller may be preloaded into the site controller. Upon checking that the license file for the site controller is up-to-date, then an appropriate full commission file may be obtained and installed in the site controller. Details of an installation of the appropriate full commission file in the site controller may be stored in a history file to be available for viewing.

The supervisor may have virtually all software modules that are in a site controller. The software modules in the supervisor may be updated. Out-of-date software modules in the site controller may be replaced with the software modules in the supervisor.

An upgrade configuration of a site controller may incorporate one or more robots that are sent to the site controller. The one or more robots may perform changes for the upgrade configuration of the site controller.

U.S. patent application Ser. No. 14/059,286, filed Oct. 21, 2013, and entitled "An Opus Enterprise Report System", is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A version control system comprising:
two or more site controllers;
a processor;
a supervisor connected to the processor for operating the supervisor, the supervisor having a screen that provides an overview of version, configuration and software upgrade information about the two or more site controllers; and
a database having updated versions, configurations and software upgrades for deployment to the one or more site controllers; and
wherein:
the two or more site controllers are assigned to site groups and categories;
two or more site controllers are selected according to site group or category for updated versions, configurations, or software upgrades based on the overview of version, configuration, or software upgrade information provided by the screen;
the versions, configurations or software upgrades are implemented by an automatic execution of a job; and
the automatic execution of the job connects the supervisor sequentially to each site controller of the group or category to implement the versions, configurations or software upgrades for each site controller by automatically executing a user-selected pre-installed configuration upgrade robot or robots within each site controller to implement the versions, configurations or software upgrades in the site controller;
the job, as automatically executed, can display on the screen operational steps, statuses and fault conditions; and
if a fault condition appears, the job can be executed again to remove the fault condition.

2. The mechanism of claim 1, wherein versions, configurations or software updates of the two or more site controllers are executed by the job with robots that are executed within each site controller according to the group or category of the one or more site controllers.

3. A method for multi-site version management comprising:
providing two or more field controllers;
providing one or more site controllers that manage the one or more field controllers;
providing a supervisor that manages the one or more site controllers;
upgrading, as needed or desired, the supervisor and the one or more site controllers;
the upgrading of the one or more site controllers comprises one or more items selected from a group consisting of commissioning a version for a site controller, an upgrade of a software module for a site controller, and an upgrade of a configuration of a site controller;
providing a top level screen on the supervisor that can display an overview of version information for the two or more site controllers;
the overview enables a determination of which site controller or controllers need a commissioning of a version, an upgrading of software, and an upgrade of a configuration without connecting individually to each of the one or more site controllers to obtain the determination;
selecting one or more site controllers from the overview for which the upgrading is a job that is automatically executed for the selected one or more site controllers, wherein the job, upon being automatically executed, sequentially connects the selected one or more site controllers to the supervisor to detect a type of each of the selected site controllers and automatically execute a user-selected pre-installed configuration upgrade robot or robots within each site controller to upgrade the site controller;

the job, as automatically executed, can display on the screen operational steps, statuses and fault conditions; and if a fault condition appears, the job can be executed again to remove the fault condition.

4. A multisite version management system comprising:

a supervisor;

a processor connected to the supervisor for operating the supervisor;

two or more remote site controllers managed by the supervisor, the supervisor having a screen that provides an overview of version, configuration and software upgrade information about the two or more remote site controllers; and one or more field controllers managed by a remote site controller; and wherein the two or more site controllers are selected from the overview for upgrading according to a group or category, the upgrading including one or more of a commissioning to another version, an upgrade of out-of-date software or an upgrade of a configuration for a site controller; and wherein the upgrading incorporates an automatically executed job that connects sequentially to each site controller selected for upgrading, detects a type of each site controller selected for upgrading after connecting to the site controller; and automatically executes a user-selected pre-installed configuration upgrade robot or robots within each site controller to upgrade the site controller;

the job, as automatically executed, can display on the screen operational steps, statuses and fault conditions; and if a fault condition appears, the job can be executed again to remove the fault condition.

5. The system of claim 4, further comprising:

an overview screen; and wherein:

the overview screen provides information pertaining to versions and upgrades of all of the one or more site controllers; and the information indicates which site controllers need another version or an upgrade.

6. The system of claim 4, wherein the one or more field controllers control one or more items selected from a group consisting of HVAC units, lighting panels, metering devices, refrigeration circuits, entry controls, security units, fire alarms, electric supplies, and water systems.

7. The system of claim 4, wherein the commissioning incorporates a full commissioning of the site controller to a new version.

8. The system of claim 4, wherein the upgrade of out-of-date software is provided from the supervisor sequentially to each site controller that has out-of-date software.

9. The system of claim 5, wherein:

a user can select an option for the upgrading of the site controllers to be upgraded; and an upgrade operation type is selected from a group consisting of full commissioning, upgrade of out-of-date software, and upgrade of a site controller configuration.

10. The system of claim 4, wherein a full commissioning comprises:

the supervisor connecting to a site controller to retrieve a host identification;

the supervisor checking a central license server to retrieve a license file for the site controller according to the host identification; and if the supervisor retrieves the license file, then the license file is installed in the site controller.

11. The system of claim 4 wherein:

a full commissioning comprises the supervisor connected to the site controller to retrieve a host identification; and the supervisor checks a pre-defined license folder within a supervisor file system structure to retrieve a license file according to the host identification; and if the supervisor retrieves the license file, then the license file is installed in the site controller.

12. The system of claim 4, wherein:

for a full commissioning, a license file for a site controller can be preloaded into the site controller;

upon checking that the license file for the site controller is up-to-date, then an appropriate full commission file can be obtained and installed in the site controller; and details of an installation of the appropriate full commission file in the site controller are stored in a history file to be available for viewing.

13. The system of claim 4, wherein:

the supervisor has software modules that are in a site controller; the software modules in the supervisor are updated; and out-of-date software modules in the site controller are replaced with the software modules in the supervisor.

14. The system of claim 4, wherein:

an upgrade configuration of a site controller incorporates one or more robots that are sent to the site controller; and the one or more robots perform changes for the upgrade configuration of the site controller.

* * * * *